(12) United States Patent
Kurasawa et al.

(10) Patent No.: US 10,949,014 B2
(45) Date of Patent: Mar. 16, 2021

(54) DISPLAY APPARATUS THAT INCLUDES ELECTRODES IN A FRAME AREA

(71) Applicant: Japan Display Inc., Tokyo (JP)

(72) Inventors: Hayato Kurasawa, Tokyo (JP); Naoki Takada, Tokyo (JP); Shota Hosaka, Tokyo (JP); Toshihiko Tanaka, Tokyo (JP); Chihiro Tanaka, Tokyo (JP); Taiki Kasai, Tokyo (JP)

(73) Assignee: Japan Display, Inc., Tokyo (JP)

( * ) Notice: Subject to any disclaimer, the term of this patent is extended or adjusted under 35 U.S.C. 154(b) by 168 days.

(21) Appl. No.: 15/722,560

(22) Filed: Oct. 2, 2017

(65) Prior Publication Data

US 2018/0095587 A1 Apr. 5, 2018

(30) Foreign Application Priority Data

Oct. 4, 2016 (JP) ................................ 2016-196647

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

2009/0085891 A1* 4/2009 Yang ..................... G06F 3/044
345/174
2010/0328259 A1 12/2010 Ishizaki et al.
(Continued)

FOREIGN PATENT DOCUMENTS

JP H7-93093 A 4/1995
JP 2011-28721 A 2/2011
(Continued)

OTHER PUBLICATIONS

Japanese Office Action issued in related Japanese Patent Application No. 2016-196647 dated Feb. 28, 2020 and English translation of same. 9 pages.
(Continued)

*Primary Examiner* — Lunyi Lao
*Assistant Examiner* — Kirk W Hermann
(74) *Attorney, Agent, or Firm* — K&L Gates LLP

(57) ABSTRACT

A display apparatus includes a first substrate, a second substrate, a display functional layer, first electrodes, second electrodes, third electrodes, and a drive circuit. The second substrate faces the first substrate. The display functional layer is provided between the first substrate and the second substrate and used to display an image in a display area. The first electrodes are provided in the display area between the first substrate and the second substrate. The second electrodes are provided, facing the first electrodes, in the display area on the surface of the second substrate. The third electrodes are provided in a frame area on the outer side of the display area. The drive circuit supplies a first drive signal to at least one of the first electrodes and the second electrodes.

12 Claims, 23 Drawing Sheets

(51) Int. Cl.
   *G06F 3/044* (2006.01)
   *G09G 3/36* (2006.01)
(52) U.S. Cl.
   CPC . *G09G 3/3655* (2013.01); *G06F 2203/04107* (2013.01); *G06F 2203/04108* (2013.01); *G09G 3/3648* (2013.01)

(56) References Cited

U.S. PATENT DOCUMENTS

| | | | | |
|---|---|---|---|---|
| 2013/0093706 | A1* | 4/2013 | Kurasawa | G06F 3/0412 345/173 |
| 2013/0155010 | A1 | 6/2013 | Curtis et al. | |
| 2014/0043288 | A1* | 2/2014 | Kurasawa | G06F 3/0412 345/174 |
| 2014/0092051 | A1* | 4/2014 | Weinerth | G06F 3/044 345/174 |
| 2016/0178974 | A1* | 6/2016 | Li | G02F 1/134336 345/174 |
| 2017/0308218 | A1* | 10/2017 | Ding | G06F 3/044 |

FOREIGN PATENT DOCUMENTS

| | | |
|---|---|---|
| JP | 2013-88932 A | 5/2013 |
| JP | 2015-18424 A | 1/2015 |
| JP | 2015-500545 A | 1/2015 |
| JP | 2015-46085 A | 3/2015 |
| JP | 2016-129065 A | 7/2016 |

OTHER PUBLICATIONS

Japanese Office Action issued in related Japanese Patent Application No. 2016-196647 dated Sep. 29, 2020 and English translation of same. 10 pages.

* cited by examiner

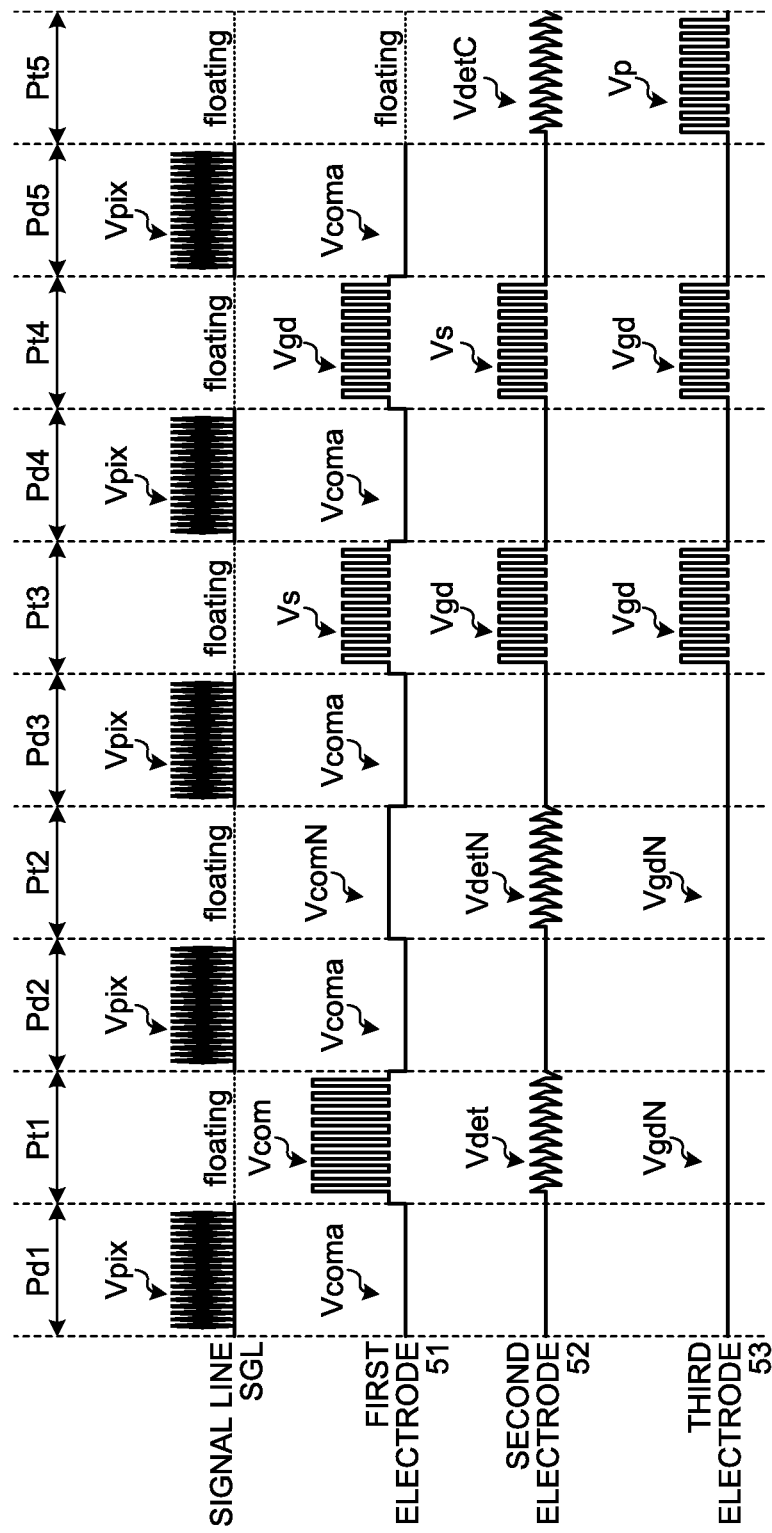

DISPLAY APPARATUS THAT INCLUDES ELECTRODES IN A FRAME AREA

CROSS-REFERENCE TO RELATED APPLICATIONS

This application claims priority from Japanese Application No. 2016-196647, filed on Oct. 4, 2016, the contents of which are incorporated by reference herein in its entirety.

BACKGROUND

1. Technical Field

The present disclosure relates to a display apparatus.

2. Description of the Related Art

Touch detection apparatuses capable of detecting an external proximity object, what are called touch panels, have recently been attracting attention. Touch panels are mounted on or integrated with a display apparatus, such as a liquid crystal display apparatus, and used as display apparatuses with a touch detection function. Some of the display apparatuses with a touch detection function have not only a touch detection function to detect contact of a finger of an operator with a screen but also a hover detection (proximity detection) function to detect a proximity state, a gesture, or the like of the finger not in contact with the screen (e.g., Japanese Patent Application Laid-open Publication No. 2015-500545 A).

Touch detection and hover detection are significantly different in the distance between a detected object serving as a target to be detected, such as a finger, and detection electrodes and in the resolution required for the detection. If electrodes and a drive configuration for touch detection are used for hover detection without any change, it may possibly be difficult to perform accurate hover detection. If detection electrodes and drive electrodes are provided separately for touch detection and hover detection to address the disadvantage described above, the configuration may possibly be complicated.

SUMMARY

According to one aspect, a display apparatus includes a first substrate, a second substrate facing the first substrate, a display functional layer provided between the first substrate and the second substrate and used to display an image in a display area, first electrodes provided in the display area between the first substrate and the second substrate, second electrodes provided in the display area on a surface of the second substrate, the second electrodes facing the first electrodes, third electrodes provided in a frame area on an outer side of the display area, and a drive circuit that supplies a first drive signal to at least one of the first electrodes and the second electrodes.

BRIEF DESCRIPTION OF THE DRAWINGS

FIG. 25 is a timing waveform chart of an exemplary operation performed by the display apparatus according to a sixth embodiment of the present invention.

DETAILED DESCRIPTION

Figure 1:
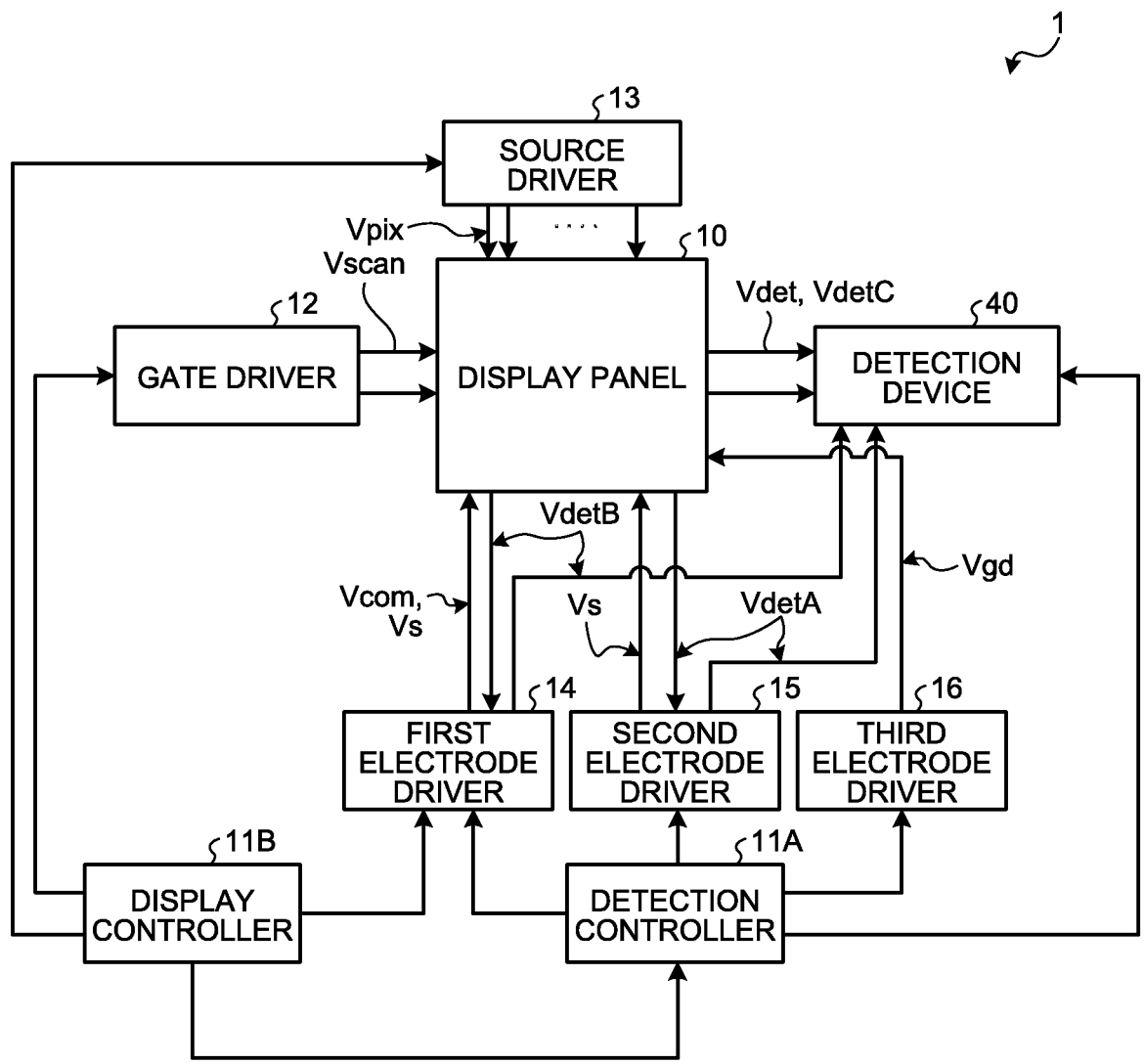
FIG. 1 is a block diagram of an exemplary configuration of a display apparatus according to a first embodiment of the present invention.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below may be combined as appropriate. The disclosure is given by way of example only, and appropriate changes made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the drawings, components similar to those previously described with reference to preceding drawings are denoted by like reference numerals, and overlapping explanation thereof may be omitted as appropriate.

First Embodiment

Figure 2:
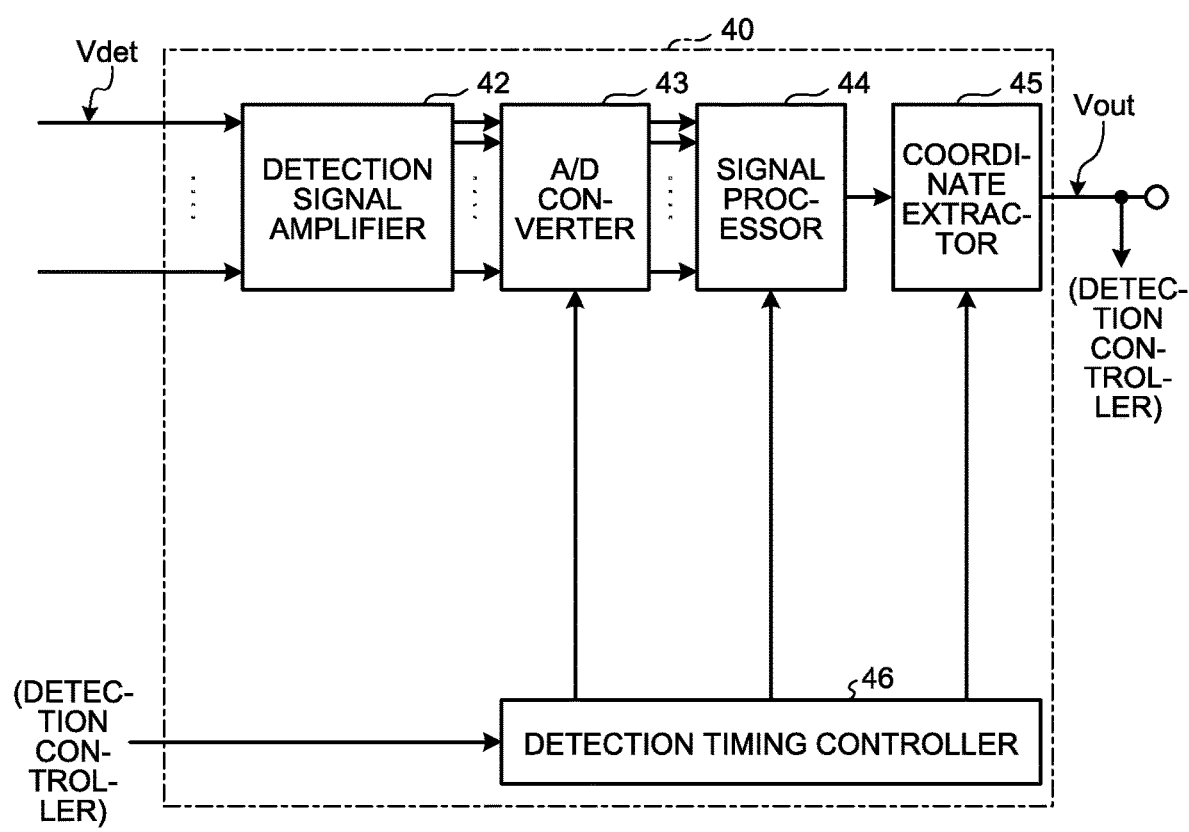
FIG. 2 is a block diagram of an exemplary configuration of a detection device.

FIG. 1 is a block diagram of an exemplary configuration of a display apparatus according to a first embodiment of the present invention. FIG. 2 is a block diagram of an exemplary configuration of a detection device. As illustrated in FIG. 1, a display panel 10 of a display apparatus 1 according to the present embodiment has a detection function to detect contact and proximity of a detected object with and to a display surface. More specifically, the display apparatus 1 according to the present embodiment includes the display panel 10, a detection controller 11A, a display controller 11B, a gate driver 12, a source driver 13, a first electrode driver 14, a second electrode driver 15, a third electrode driver 16, and a detection device 40.

The display panel 10 includes a plurality of pixels having display elements and has a display surface facing the pixels. The display panel 10 receives video signals to display an image composed of the pixels on the display surface.

The display controller 11B is a circuit that supplies control signals to the gate driver 12, the source driver 13, and the first electrode driver 14 based on the video signals supplied from the outside to mainly control a display operation. The display controller 11B supplies control signals to the detection controller 11A, thereby performing control such that the gate driver 12, the source driver 13, and the detection controller 11A operate synchronously or asynchronously with one another.

The gate driver 12 has a function to sequentially select one horizontal line to be a target of display drive in the display panel 10 based on the control signals supplied from the display controller 11B.

The source driver 13 is a circuit that supplies pixel signals Vpix to respective sub-pixels SPix of the display panel 10 based on the control signals supplied from the display controller 11B. The display controller 11B may generate the pixel signals Vpix and supply them to the source driver 13.

The first electrode driver 14 is a circuit that supplies display drive signals Vcoma or detection drive signals Vcom to first electrodes 51 of the display panel 10 based on the control signals supplied from the display controller 11B.

The detection controller 11A controls a detection operation for detecting a detected object such as a finger of a user (hereinafter, simply referred to as a detected object) on the display panel 10. The display panel 10 has a function to detect a position of the detected object in contact with the display surface of the display panel 10 based on the basic principle of mutual capacitance touch detection. The display panel 10 further has a function to detect a position and a movement of the detected object not in contact with the display surface based on the basic principle of mutual capacitance touch detection. If the display panel 10 detects contact or proximity of the detected object, the display panel 10 outputs detection signals Vdet to the detection device 40.

The display panel 10 may have a function to detect a position of the detected object based on the basic principle of self-capacitance touch detection. The first electrode driver 14 supplies drive signals Vs to the first electrodes 51 based on control signals supplied from the detection controller 11A in self-capacitance touch detection. The second electrode driver 15 is a circuit that supplies the drive signals Vs to second electrodes 52 based on the control signals supplied from the detection controller 11A in self-capacitance touch detection. The third electrode driver 16 is a circuit that supplies guard signals Vgd to third electrodes 53 in touch detection.

The detection device 40 is a circuit that determines whether a touch is made by the detected object on the display surface of the display panel 10 based on the control signals supplied from the detection controller 11A and on the detection signals Vdet output from the display panel 10 in mutual capacitance touch detection. The detection device 40 can also determine whether a touch is made on the display panel 10 based on the control signals supplied from the detection controller 11A and on detection signals VdetA and VdetB output from the display panel 10 via the first electrode driver 14 or the second electrode driver 15 in self-capacitance touch detection. If a touch is detected, the detection device 40 calculates coordinates at which the touch input is performed, for example. The detection device 40 also detects a gesture of the detected object in proximity to the display panel 10 based on detection signals VdetC output from the third electrodes 53.

As illustrated in FIG. 2, the detection device 40 includes a detection signal amplifier 42, an analog/digital (A/D) converter 43, a signal processor 44, a coordinate extractor 45, and a detection timing controller 46. The detection timing controller 46 performs control such that the detection signal amplifier 42, the A/D converter 43, the signal processor 44, and the coordinate extractor 45 operate synchronously with one another based on the control signals supplied from the detection controller 11A.

The detection signal amplifier 42 amplifies the detection signals Vdet supplied from a touch panel 30. The A/D converter 43 samples analog signals output from the detection signal amplifier 42 at a timing synchronized with the drive signals Vcom, thereby converting the analog signals into digital signals.

The signal processor 44 is a logic circuit that determines whether a touch is made on the touch panel 30 based on the output signals from the A/D converter 43. The signal processor 44 performs processing of extracting a signal (absolute value |ΔV|) of the difference between the detection signals caused by a finger. The signal processor 44 compares the absolute value |ΔV| with a predetermined threshold voltage. If the absolute value |ΔV| is lower than the threshold voltage, the signal processor 44 determines that an external proximity object is in a non-contact state. By contrast, if the absolute value |ΔV| is equal to or higher than the threshold voltage, the signal processor 44 determines that an external proximity object is in a contact state or a proximity state. The detection device 40 thus can perform touch detection and gesture detection.

The coordinate extractor 45 is a logic circuit that calculates, when the signal processor 44 detects a touch, the touch panel coordinates of the touch. The coordinate extractor 45 outputs the touch panel coordinates as output signals Vout. The coordinate extractor 45 may output the output signals Vout to the display controller 11B. The display controller 11B can perform a predetermined display operation or a predetermined detection operation based on the output signals Vout.

Figure 3:
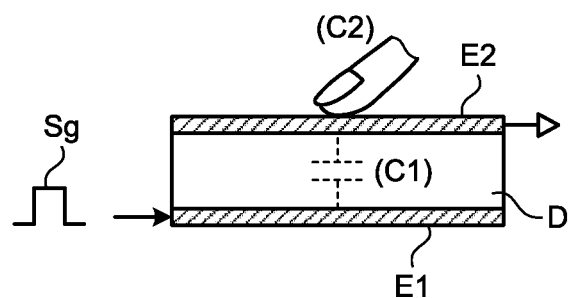
FIG. 3 is a diagram for explaining the basic principle of mutual capacitance touch detection.
Figure 4:
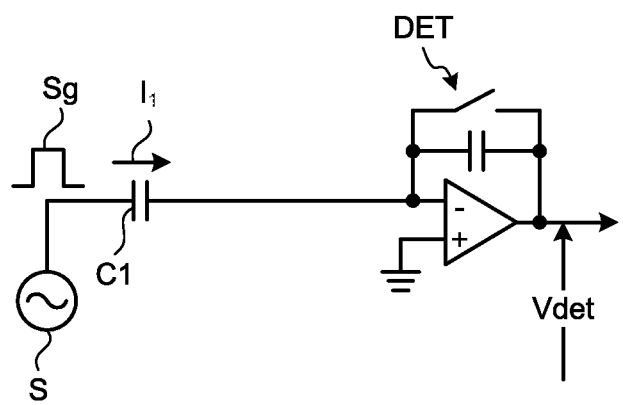
FIG. 4 is a diagram of an example of an equivalent circuit for explaining the basic principle of mutual capacitance touch detection.
Figure 5:
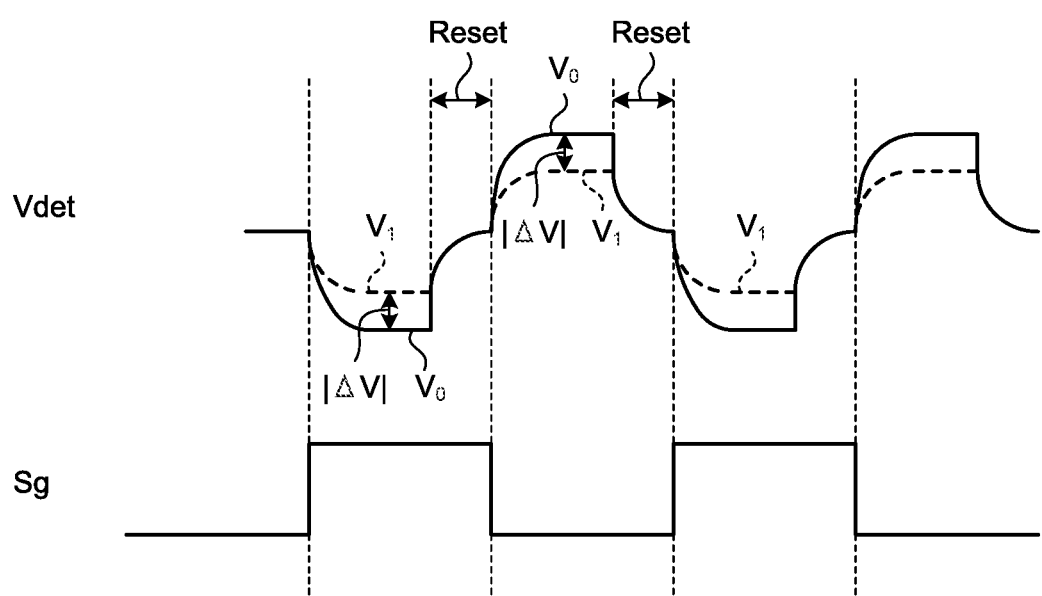
FIG. 5 is a diagram of an example of waveforms of a drive signal and a detection signal in mutual capacitance touch detection.

The display panel 10 performs touch control based on the basic principle of capacitance touch detection. The following describes the basic principle of mutual capacitance touch detection performed on the display panel 10 according to the present embodiment with reference to FIGS. 3 to 5. FIG. 3 is a diagram for explaining the basic principle of mutual capacitance touch detection. FIG. 4 is a diagram of an example of an equivalent circuit for explaining the basic principle of mutual capacitance touch detection. FIG. 5 is a diagram of an example of waveforms of a drive signal and a detection signal in mutual capacitance touch detection. While the following describes a case where a finger serving as a detected object is in contact with or in proximity to a detection electrode, the detected object is not limited thereto and may be an object including a conductor, such as a stylus.

As illustrated in FIG. 3, for example, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) generated between the facing surfaces of the drive electrode E1 and the detection electrode E2. As illustrated in FIG. 4, a first end of the capacitance element C1 is coupled to an alternating-current (AC) signal source (drive signal source) S, and a second end thereof is coupled to a voltage detector DET. The voltage detector DET is an integration circuit included in the detection device 40 illustrated in FIG. 1, for example.

When the AC signal source S applies an AC rectangular wave Sg at a predetermined frequency (e.g., approximately several kilohertz to several hundred kilohertz) to the drive electrode E1 (first end of the capacitance element C1), an output waveform (detection signal Vdet) illustrated in FIG. 5 is generated via the voltage detector DET. The AC rectangular wave Sg corresponds to the drive signal Vcom received from the first electrode driver 14.

In a state where a finger is neither in contact with the detection electrode nor in proximity to the detection electrode close enough to consider it in contact therewith (hereinafter, these states are collectively referred to as a non-contact state), an electric current associated with the capacitance value of the capacitance element C1 flows. The voltage detector DET illustrated in FIG. 4 converts fluctuations in the electric current associated with the AC rectangular wave Sg into fluctuations in the voltage (waveform $V_0$ indicated by the solid line (refer to FIG. 5)).

By contrast, in a state where a finger is in contact with the detection electrode or in proximity to the detection electrode close enough to consider it in contact therewith (hereinafter, these states are collectively referred to as a contact state), capacitance C2 generated by the finger is in contact with the detection electrode E2 or in proximity to the detection electrode E2 close enough to consider it in contact therewith as illustrated in FIG. 3. The fringe lines of electric force between the drive electrode E1 and the detection electrode E2 are blocked by a conductor (finger). As a result, the capacitance element C1 acts as a capacitance element having a capacitance value smaller than that in the non-contact state. As illustrated in FIGS. 4 and 5, the voltage detector DET converts fluctuations in an electric current $I_1$ associated with the AC rectangular wave Sg into fluctuations in the voltage (waveform $V_1$ indicated by the dotted line).

In this case, the waveform $V_1$ has amplitude smaller than that of the waveform $V_0$. Consequently, the absolute value |ΔV| of voltage difference between the waveform $V_0$ and the waveform $V_1$ varies depending on an effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset, the voltage detector DET can accurately detect the absolute value |ΔV| of the voltage difference.

As described above, the detection device 40 compares the absolute value |ΔV| with the predetermined threshold voltage, thereby determining whether the external proximity object is in the non-contact state or in the contact or proximity state. The detection device 40 thus can perform touch detection or gesture detection based on the basic principle of mutual capacitance touch detection.

The detection signal amplifier 42, the A/D converter 43, the signal processor 44, the coordinate extractor 45, and the detection timing controller 46 of the detection device 40 are mounted on the display apparatus 1. The present invention is not limited thereto, and all or part of the functions of the detection device 40 may be provided to an external processor, for example. The coordinate extractor 45, for example, may be mounted on an external processor separately from the display apparatus 1 and the detection device 40 may output the signals processed by the signal processor 44 as the output signals Vout.

Figure 6:
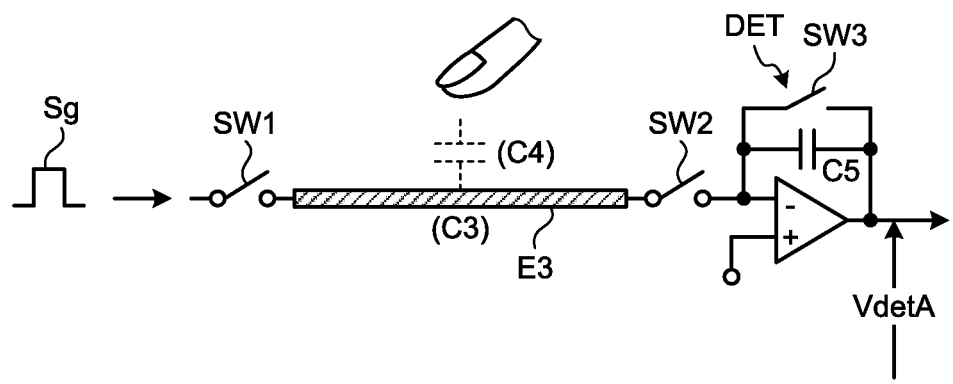
FIG. 6 is a diagram for explaining the basic principle of self-capacitance touch detection.
Figure 7:
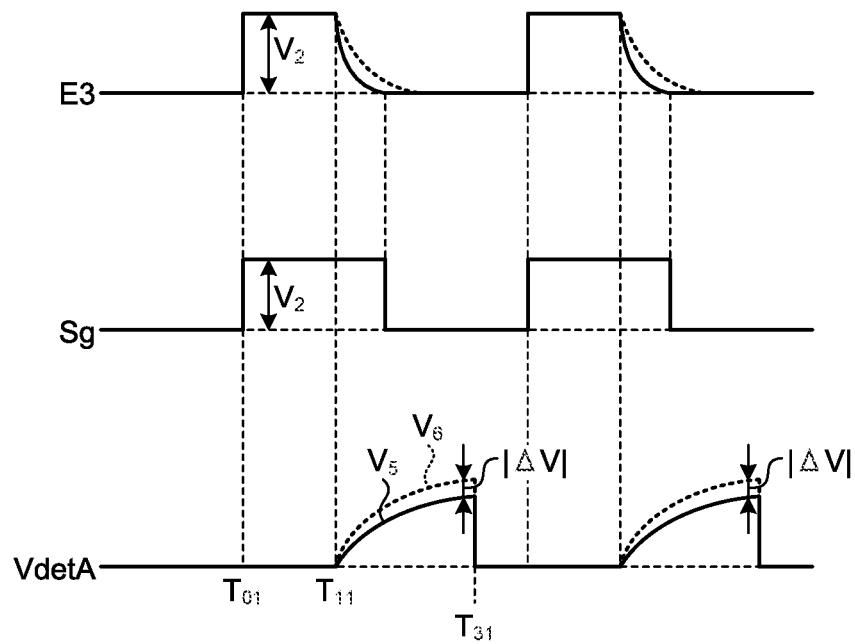
FIG. 7 is a diagram of an example of waveforms of a drive signal and a detection signal in self-capacitance touch detection.

The following describes the basic principle of self-capacitance touch detection performed on the touch panel 30 according to the present embodiment with reference to FIGS. 6 and 7. FIG. 6 is a diagram for explaining the basic principle of self-capacitance touch detection. FIG. 7 is a diagram of an example of waveforms of a drive signal and a detection signal in self-capacitance touch detection. FIG. 6 also illustrates a detection circuit.

In the non-contact state, the AC rectangular wave Sg at a predetermined frequency (e.g., approximately several kilohertz to several hundred kilohertz) is applied to a detection electrode E3. The detection electrode E3 has capacitance C3, and an electric current associated with the capacitance C3 flows. The voltage detector DET converts fluctuations in the electric current associated with the AC rectangular wave Sg into fluctuations in the voltage (waveform $V_5$ indicated by the solid line (refer to FIG. 7)).

As illustrated in FIG. 6, in the contact state, capacitance C4 between the finger and the detection electrode E3 is added to the capacitance C3 of the detection electrode E3. When the AC rectangular wave Sg is applied to the detection electrode E3, an electric current associated with the capacitance C3 and the capacitance C4 flows. As illustrated in FIG. 7, the voltage detector DET converts fluctuations in the electric current associated with the AC rectangular wave Sg into fluctuations in the voltage (waveform $V_6$ indicated by the dotted line). The voltage detector DET detects contact of the finger based on the absolute value |ΔV| of the difference between the waveform $V_5$ and the waveform $V_6$.

Specifically, as illustrated in FIG. 7, the voltage level of the AC rectangular wave Sg rises by an amount corresponding to voltage $V_2$ at time $T_{01}$. At this time, a switch SW1 is turned on, and a switch SW2 is turned off. As a result, the electric potential of the detection electrode E3 also rises by voltage $V_2$. Subsequently, the switch SW1 is turned off before time $T_{11}$. While the detection electrode E3 is in a floating state at this time, the electric potential of the detection electrode E3 is maintained at $V_2$ by the capacitance C3 (or C3+C4, refer to FIG. 6) of the detection electrode E3. Subsequently, the voltage detector DET performs a reset operation before time $T_{11}$.

Subsequently, when the switch SW2 is turned on at time $T_{11}$, the electric charge accumulated in the capacitance C3 (or C3+C4) of the detection electrode E3 moves to capacitance C5 in the voltage detector DET. As a result, output from the voltage detector DET is increased (refer to the detection signal VdetA in FIG. 7). When a finger or the like is not in proximity to the detection electrode E3, the output (detection signal VdetA) from the voltage detector DET corresponds to the waveform $V_5$ indicated by the solid line, and VdetA=C3×$V_2$/C5 is satisfied. When capacitance caused by a finger or the like is added, the output corresponds to the waveform $V_6$ indicated by the dotted line, and VdetA=(C3+C4)×$V_2$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to that of the AC rectangular wave Sg, and the voltage detector DET is reset. The operation described above is repeatedly performed at a predetermined frequency (e.g., approximately several kilohertz to several hundred kilohertz). The detection device 40 thus can perform touch detection based on the basic principle of self-capacitance touch detection.

Figure 8:
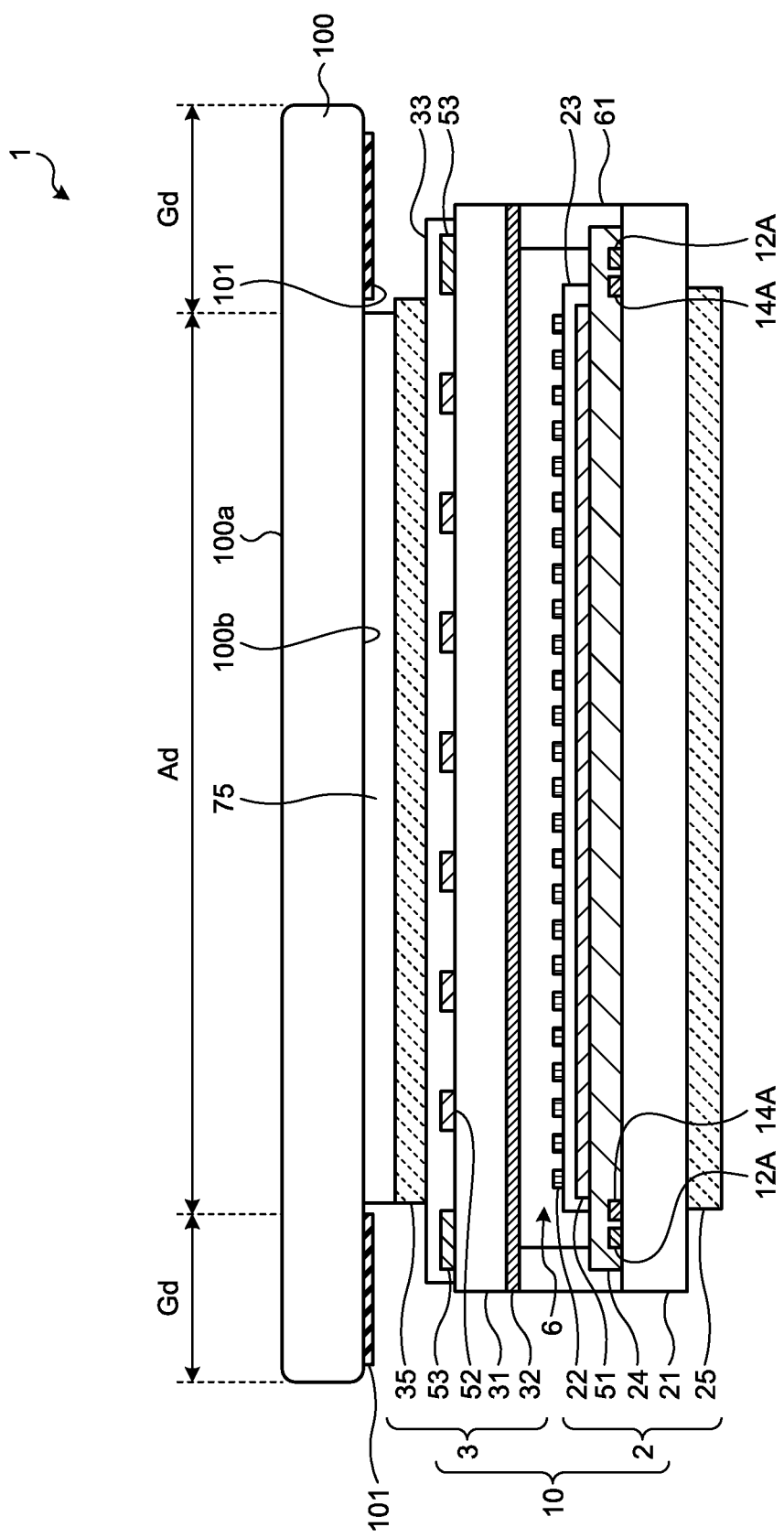
FIG. 8 is a sectional view of a schematic sectional structure of the display apparatus according to the first embodiment.

The following describes an exemplary configuration of the display apparatus 1 according to the present embodiment in greater detail. FIG. 8 is a sectional view of a schematic sectional structure of the display apparatus according to the first embodiment. As illustrated in FIG. 8, the display apparatus 1 includes the display panel 10 and a cover member 100 provided on the display panel 10 with an adhesive layer 75 interposed therebetween.

The cover member 100 has a first surface 100a and a second surface 100b opposite to the first surface 100a. The cover member 100 is a plate-like or film-like member. Examples of the cover member 100 include, but are not limited to, a glass substrate, a resin substrate, a resin film, etc. The first surface 100a is a detection surface serving as a reference surface in detection of a detected object. In the following description, detecting contact of a detected object with the detection surface is referred to as touch detection. Detecting a position and a movement of the detected object not in contact with the detection surface is referred to as hover detection. As described above, the display apparatus 1 according to the present embodiment performs touch detection when the detected object comes into contact with the first surface 100a. In addition, the display apparatus 1 can perform what is called hover detection (proximity detection) of detecting the position of the detected object away from the first surface 100a by a predetermined distance. The first surface 100a also serves as a display surface on which an observer views an image on the display panel 10 passing through a display area Ad.

While the cover member 100 and the display panel 10 according to the present embodiment have a rectangular shape in planar view, the shape is not limited thereto. The cover member 100 and the display panel 10 may have a circular shape, an elliptical shape, or a deformed shape obtained by removing part of these outer shapes. The cover member 100 and the display panel 10 may have different outer shapes like in a case where the cover member 100 has a circular shape and the display panel 10 has a regular polygonal shape, for example. The cover member 100 is not limited to a plate-like member. The display apparatus 1 may be a curved surface display apparatus having a curved surface like in a case where the display area Ad has a curved surface or where a frame area Gd is bent toward the display panel 10, for example.

As illustrated in FIG. 8, a decorative layer 101 is provided in the frame area Gd on the second surface 100b of the cover member 100. The decorative layer 101 is a colored layer having light transmittance lower than that of the cover member 100. The decorative layer 101 covers wiring, circuits, and other components in the frame area Gd, thereby preventing them from being visually recognized by the observer. While the decorative layer 101 is provided on the second surface 100b in the example illustrated in FIG. 8, it may be provided on the first surface 100a or the display panel 10. The decorative layer 101 is not limited to a single layer and may be a multilayer composed of a plurality of layers.

The display panel 10 includes a pixel substrate 2, a counter substrate 3, and a liquid crystal layer 6 serving as a display functional layer. The counter substrate 3 is arranged facing the pixel substrate 2 in a direction perpendicular to the surface of the pixel substrate 2. The liquid crystal layer 6 is provided between the pixel substrate 2 and the counter substrate 3.

The pixel substrate 2 includes a first substrate 21, pixel electrodes 22, the first electrodes 51, a thin film transistor (TFT) layer 24, and a polarizing plate 25. The TFT layer 24 is provided on the first substrate 21. The TFT layer 24 includes circuits, such as gate scanner circuits 12A included in the gate driver 12, switching elements Tr, which will be described later, and various kinds of wiring, such as gate lines GCL and signal lines SGL. The first electrodes 51 are provided on the upper side of the TFT layer 24. The pixel electrodes 22 are provided on the upper side of the first electrodes 51 with an insulating layer 23 interposed therebetween and are arranged in a matrix (row-column configuration) in planar view. The pixel electrodes 22 are provided in correspondence with the respective sub-pixels SPix constituting each pixel Pix in the display panel 10. The pixel electrodes 22 are supplied with the pixel signals Vpix for performing a display operation. The first electrodes 51 are supplied with the direct-current (DC) display drive signals Vcoma in the display operation to serve as common electrodes for the pixel electrodes 22.

In the present specification, the "upper side" indicates a direction from the first substrate 21 toward a second substrate 31 in a direction perpendicular to the first substrate 21. The "lower side" indicates a direction from the second substrate 31 toward the first substrate 21. The "planar view" indicates a view seen in the direction perpendicular to the surface of the first substrate 21.

The TFT layer 24, the first electrodes 51, the insulating layer 23, and the pixel electrodes 22 according to the present embodiment are laminated in this order above the first substrate 21. The polarizing plate 25 is provided on the lower side of the first substrate 21 with an adhesive member, which is not illustrated, interposed therebetween. The pixel electrodes 22 and the first electrodes 51 are made of a translucent conductive material, such as indium tin oxide (ITO).

The array of the pixel electrodes 22 is not limited to a matrix array in which the pixel electrodes 22 are arrayed in a first direction and a second direction orthogonal to the first direction. Alternatively, adjacent pixel electrodes 22 may be arranged in a manner deviated in the first direction or the second direction. Still alternatively, adjacent pixel electrodes 22 may have different sizes, and two or three pixel electrodes 22 may be arranged on one side of one pixel electrode 22 included in a pixel column arrayed in the first direction.

The counter substrate 3 includes the second substrate 31, a color filter 32, the second electrodes 52, the third electrodes 53, and a polarizing plate 35. The color filer 32 is provided on a first surface of the second substrate 31. The second electrodes 52 and the third electrodes 53 are provided on a second surface of the second substrate 31. The polarizing plate 35 is provided on the upper side of the second electrodes 52 and the third electrodes 53 with an insulating layer 33 interposed therebetween. The second electrodes 52 and the third electrodes 53 serve as detection electrodes of the display panel 10. The configuration of the second electrodes 52 and the third electrodes 53 will be described later in detail. The color filer 32 faces the liquid crystal layer 6 in the direction perpendicular to the first substrate 21. The color filter 32 may be arranged on the upper side of the first substrate 21. Examples of the first substrate 21 and the second substrate 31 according to the present embodiment include, but are not limited to, glass substrates, resin substrates, etc.

The second surface 100b of the cover member 100 is bonded to the polarizing plate 35 with the adhesive layer 75 interposed therebetween. Examples of the adhesive layer 75 include, but are not limited to, an optical clear adhesive (OCA) film, an optical clear resin serving as a liquid UV-curing resin, etc.

The first substrate 21 and the second substrate 31 are arranged facing each other with a predetermined gap interposed therebetween. The space between the first substrate 21 and the second substrate 31 is sealed with a sealing portion 61. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals that can be twisted by a lateral electric-field mode, such as the in-plane switching (IPS) mode including the fringe field switching (FFS) mode. An orientation film is provided between the liquid crystal layer 6 and the pixel substrate 2 and between the liquid crystal layer 6 and the counter substrate 3 illustrated in FIG. 8.

An illuminator (backlight), which is not illustrated, is provided on the lower side of the first substrate 21. The illuminator includes a light source, such as light emitting diodes (LED), and outputs light from the light source to the first substrate 21. The light from the illuminator passes through the pixel substrate 2. The light is modulated depending on the state of the liquid crystals at the position, whereby the state of transmission of light to the display surface varies depending on the positions. As a result, an image is displayed on the display surface (first surface 100a).

Figure 9:
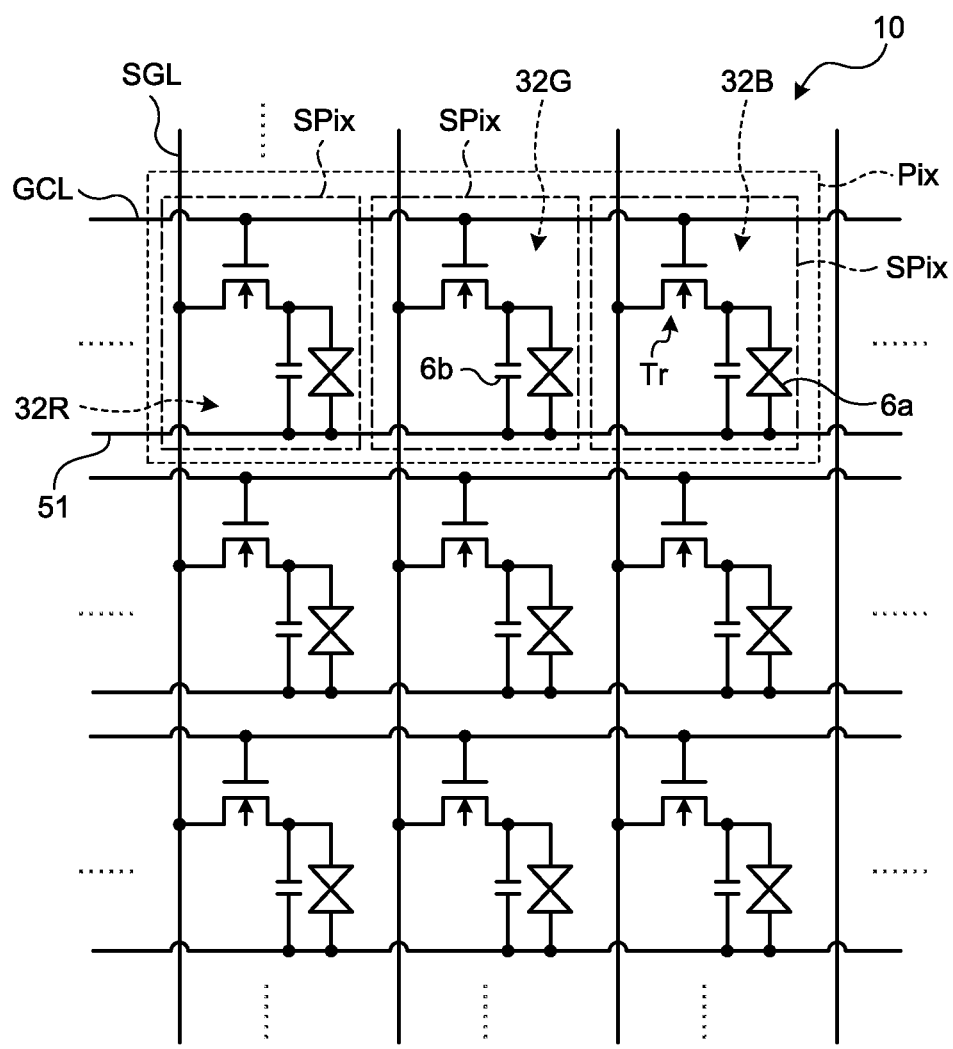
FIG. 9 is a circuit diagram of a pixel array in a display device with a detection function according to the first embodiment.

The following describes a display operation performed by the display panel 10. FIG. 9 is a circuit diagram of a pixel array in a display device with a detection function according to the first embodiment. The TFT layer 24 of the first substrate 21 (refer to FIG. 8) is provided with the switching elements Tr of the respective sub-pixels SPix and wiring, such as the signal lines SGL and the gate lines GCL, as illustrated in FIG. 9. The signal lines SGL are wiring that supplies the pixel signals Vpix to the respective pixel electrodes 22. The gate lines GCL are wiring that supplies drive signals for driving the switching elements Tr. The signal lines SGL and the gate lines GCL are provided on a plane parallel to the surface of the first substrate 21.

The display panel 10 illustrated in FIG. 9 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 23 is provided between the pixel electrodes 22 and the common electrodes (first electrodes 51) to form holding capacitance 6b illustrated in FIG. 9.

The gate driver 12 illustrated in FIG. 1 drives to sequentially scan the gate lines GCL. The gate driver 12 applies scanning signals Vscan (refer to FIG. 1) to the gates of the switching elements Tr of the respective sub-pixels SPix via the gate line GCL. The gate driver 12 thus sequentially selects one row (one horizontal line) out of the sub-pixels SPix as a target of display drive. The source driver 13 supplies the pixel signals Vpix to the sub-pixels SPix constituting the one selected horizontal line via the signal lines SGL. To perform the display operation in units of one horizontal line, the first electrode driver 14 applies the display drive signals Vcoma to the first electrodes 51. As a result, the first electrodes 51 serve as the common electrodes for the pixel electrodes 22 in the display operation. The first electrodes 51 according to the present embodiment are provided along the gate lines GCL and intersect with the signal lines SGL. The present invention is not limited thereto, and the first electrodes 51 may be provided along a direction intersecting with the gate lines GCL, for example.

The color filter 32 illustrated in FIG. 8 may include periodically arrayed color areas in three colors of red (R), green (G), and blue (B), for example. Color areas 32R, 32G, and 32B of the three colors of R, G, and B, respectively, serve as a set and correspond to the respective sub-pixels SPix illustrated in FIG. 9. A set of sub-pixels SPix corresponding to the respective color areas 32R, 32G, and 32B of the three colors constitutes a pixel Pix.

Figure 10:
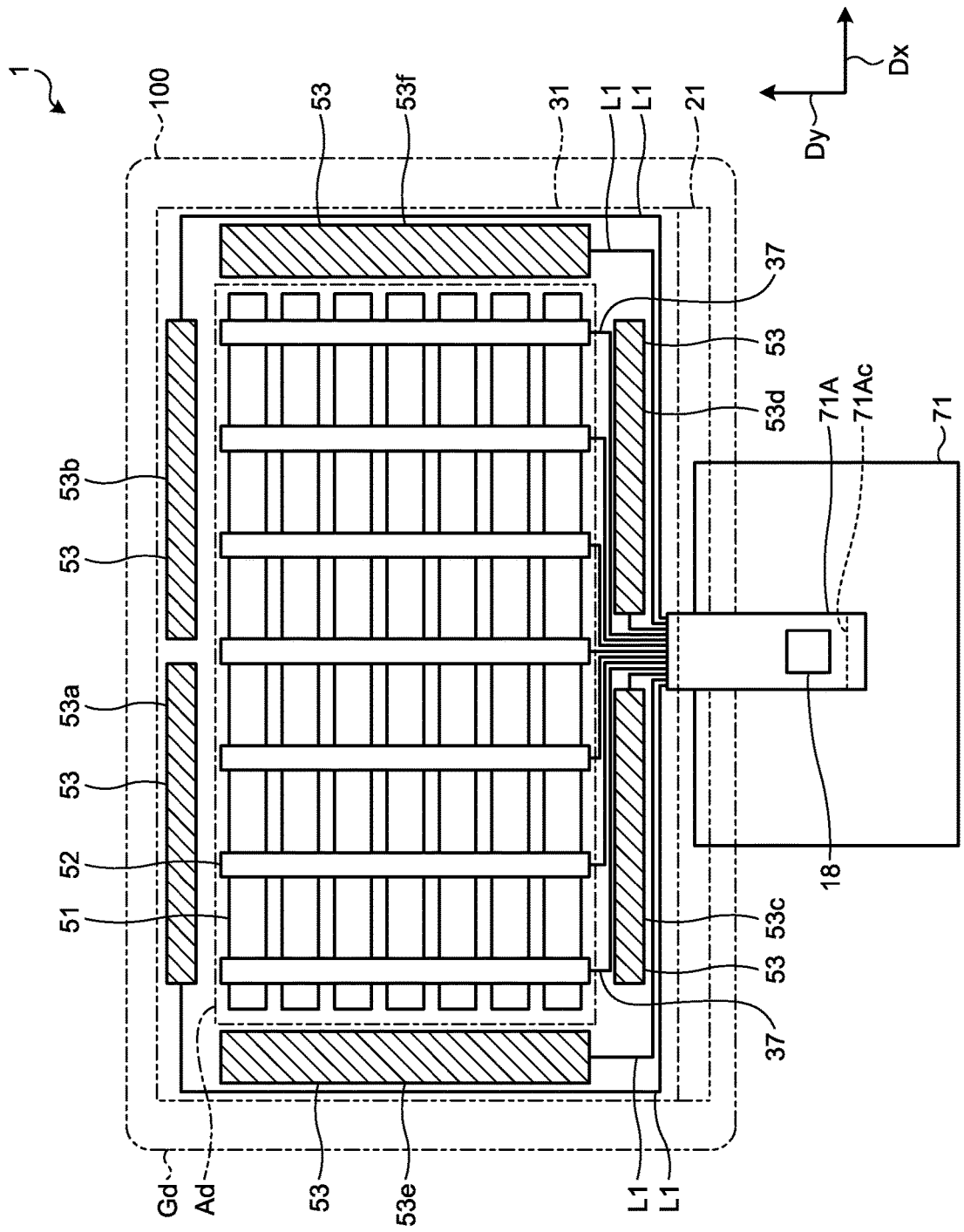
FIG. 10 is a plan view schematically illustrating the relation among first electrodes, second electrodes, and third electrodes.
Figure 11:
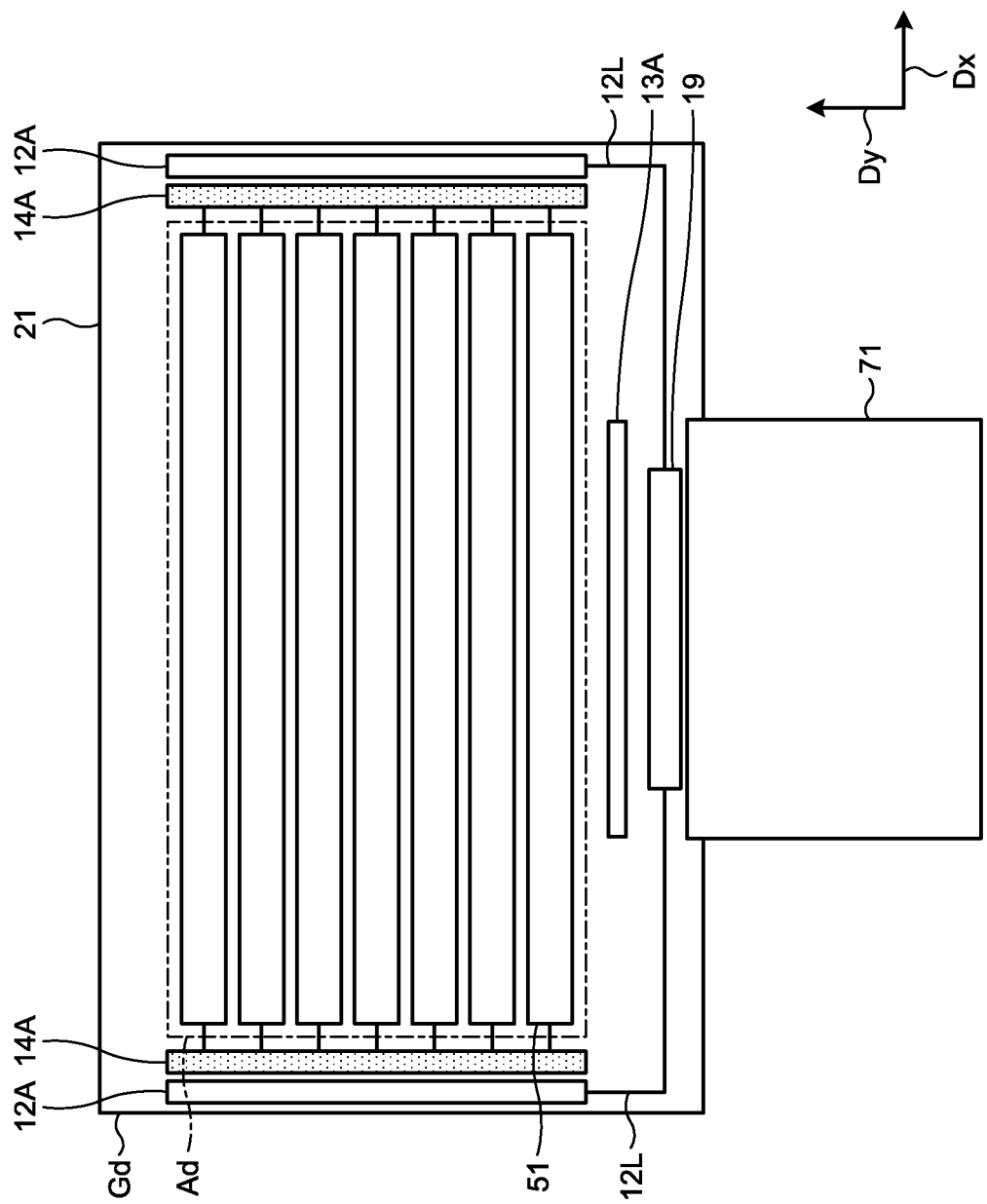
FIG. 11 is a plan view for explaining the configuration of the first electrodes provided to a first substrate.
Figure 12:
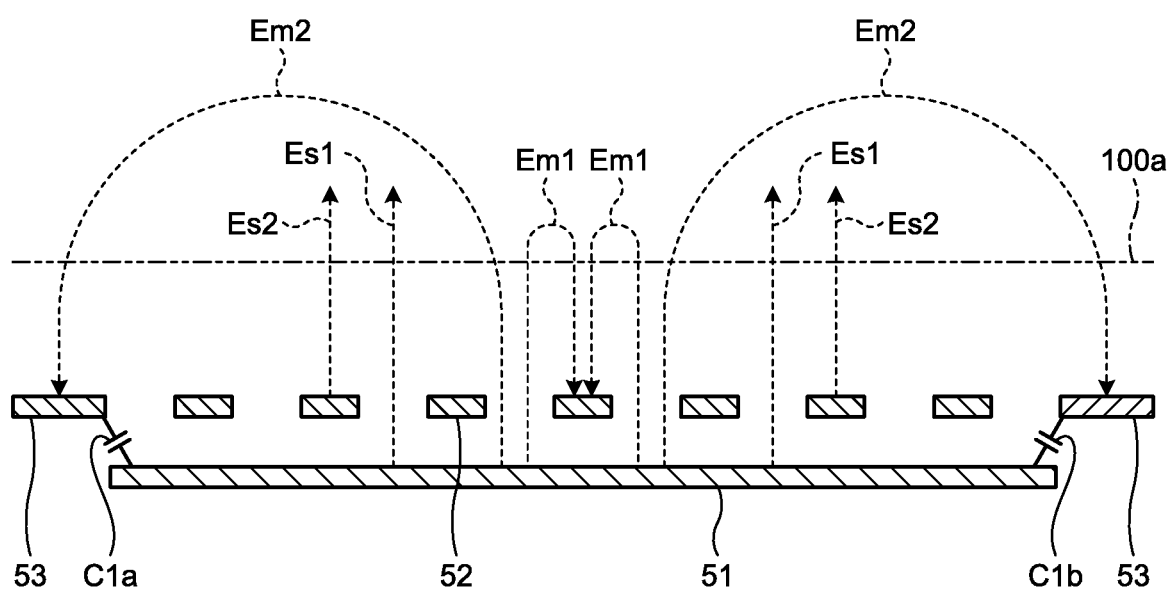
FIG. 12 is a diagram for explaining lines of electric force in an electric field extending from the first electrodes, the second electrodes, and the third electrodes.

The following describes the configuration of the first electrodes 51, the second electrodes 52, and the third electrodes 53. FIG. 10 is a plan view schematically illustrating the relation among the first electrodes, the second electrodes, and the third electrodes. FIG. 11 is a plan view for explaining the configuration of the first electrodes provided to the first substrate. FIG. 12 is a diagram for explaining lines of electric force in an electric field extending from the first electrodes, the second electrodes, and the third electrodes. To simplify the explanation of FIG. 10, the first electrodes 51, the second electrodes 52, and the third electrode 53 are indicated by the solid lines, and the cover member 100, the first substrate 21, and the second substrate 31 are indicated by the alternate long and two short dashes lines.

As illustrated in FIGS. 10 and 11, the frame area Gd is provided on the outer side of the display area Ad. In the present specification, the display area Ad is an area for displaying an image and an area overlapping with the pixels Pix (sub-pixels SPix). The frame area Gd is a frame-like area surrounding the display area Ad. The direction along the long side of the frame area Gd is referred to as a first direction Dx, and the direction intersecting with the first direction Dx is referred to as a second direction Dy.

As illustrated in FIGS. 10 and 11, the first electrodes 51 are provided in the display area Ad of the first substrate 21. The first electrode 51 is provided along the first direction Dx and a plurality of the first electrodes 51 are arrayed in the second direction Dy. As illustrated in FIG. 11, the frame area Gd of the first substrate 21 is provided with various circuits, such as the gate scanner circuits 12A, a multiplexer 13A, and first electrode scanner circuits 14A.

The gate scanner circuits 12A and the first electrode scanner circuits 14A are arranged adjacent to the ends of the first electrodes 51. While the gate scanner circuits 12A and the first electrode scanner circuits 14A according to the present embodiment are respectively arranged on one end side and the other end side of the first electrodes 51, they may be arranged on one of the sides. The multiplexer 13A is arranged between the first electrodes 51 and a flexible substrate 71.

The frame area Gd of the first substrate 21 is provided with a display integrated circuit (IC) 19 that controls the display operation performed on the display panel 10. The flexible substrate 71 is coupled to the frame area Gd of the first substrate 21. A flexible substrate 71A is coupled to the frame area Gd of the second substrate 31. The flexible substrate 71A is electrically coupled to the flexible substrate 71 via a connection 71Ac. The flexible substrate 71A is provided with a detection IC 18 that controls the detection operation performed on the display panel 10. The configurations of the detection IC 18 and the display IC 19 are not limited to those described above, and the detection IC 18 and the display IC 19 may be provided to an external control substrate outside the module, for example. The detection IC 18 serves as the detection controller 11A and the detection device 40 illustrated in FIG. 1. Part of the functions of the detection device 40 may be included in the display IC 19 or provided as functions of an external micro-processing unit (MPU). The display IC 19 serves as the display controller 11B illustrated in FIG. 1.

The gate scanner circuits 12A are included in the gate driver 12 (refer to FIG. 1). The gate scanner circuits 12A sequentially select the gate lines GCL based on control signals supplied from the display IC 19 via wires 12L. The multiplexer 13A is a circuit included in the source driver 13 (refer to FIG. 1). The multiplexer 13A sequentially selects the signal lines SGL based on control signals supplied from the display IC 19. The first electrode scanner circuits 14A are included in the first electrode driver 14 (refer to FIG. 1). The first electrode scanner circuits 14A sequentially or simultaneously select the first electrodes 51 based on control signals supplied from the display IC 19 or the detection IC 18.

As illustrated in FIGS. 8 and 10, the second electrodes 52 are provided in the display area Ad of the second substrate 31. The second electrode 52 is provided along the second direction Dy and a plurality of the second electrodes 52 are arrayed in the first direction Dx. In other words, the second electrodes 52 intersect with the first electrodes 51. Capacitance is generated at the intersections of the first electrodes 51 and the second electrodes 52. Similarly to the first electrodes 51, the second electrodes 52 are made of a translucent conductive material, such as ITO. The second electrodes 52 may be made of a metal material. In this case, the second electrodes 52 may include a plurality of metal wires having a zigzag line shape, a wavy line shape, or a mesh shape.

To perform mutual capacitance touch detection on the display panel 10, the first electrode driver 14 sequentially scans the first electrodes 51 in a time-division manner to supply the drive signals Vcom (second drive signals). In this case, the first electrode driver 14 may simultaneously select a plurality of first electrodes 51 constituting a drive electrode block and sequentially supply the drive signals Vcom in units of drive electrode blocks. The second electrodes 52 output the detection signals Vdet associated with a change in the capacitance between the first electrodes 51 and the second electrodes 52. The first electrodes 51 correspond to the drive electrode E1 in the basic principle of mutual capacitance touch detection, and the second electrodes 52 correspond to the detection electrode E2.

The first electrodes 51 illustrated in FIGS. 10 and 11 serve as the common electrodes for the pixel electrodes 22 in the display panel 10. The first electrodes 51 also serve as the drive electrodes in mutual capacitance touch detection performed on the display panel 10.

While the present embodiment describes a case where the display apparatus 1 performs mutual capacitance touch detection, it may perform self-capacitance touch detection based on a change in the capacitance of each of the first electrodes 51 and the second electrodes 52.

In self-capacitance touch detection, the first electrode driver 14 (refer to FIG. 1) supplies the drive signals Vs to the first electrodes 51. The first electrodes 51 output the detection signals VdetB associated with a change in the capacitance of the first electrodes 51 to the detection device 40 via the first electrode driver 14. The detection device 40 can calculate the position of the detected object in contact with or in proximity to the first surface 100a in the second direction Dy based on the detection signals VdetB output from the respective first electrodes 51. The first electrode driver 14 may supply the drive signals Vs simultaneously to a plurality of first electrodes 51 or sequentially scan the first electrodes 51 to supply the drive signals Vs to them.

Similarly, the second electrode driver 15 (refer to FIG. 1) supplies the drive signals Vs to the second electrodes 52. The second electrodes 52 output the detection signals VdetA associated with a change in the capacitance of the second electrodes 52 to the detection device 40 via the second electrode driver 15. The detection device 40 can calculate the position of the detected object in contact with or in proximity to the first surface 100a in the first direction Dx based on the detection signals VdetA output from the respective second electrodes 52. The second electrode driver 15 may supply the drive signals Vs simultaneously to a plurality of second electrodes 52 or sequentially scan the second electrodes 52 to supply the drive signals Vs to them.

The detection device 40 can calculate the coordinates of the position at which the detected object is in contact with or in proximity to the first surface 100a based on the detection signals VdetB output from the first electrodes 51 and the detection signals VdetA output from the second electrodes 52. As described above, the first electrodes 51 and the second electrodes 52 correspond to the detection electrode E3 in the basic principle of self-capacitance touch detection. In other words, the first electrodes 51 and the second electrodes 52 also serve as the detection electrodes in self-capacitance touch detection performed on the display panel 10.

As illustrated in FIG. 10, the third electrodes 53 are provided in the frame area Gd of the second substrate 31 in a manner surrounding the first electrodes 51 and the second electrodes 52 in planar view. The third electrodes 53 according to the present embodiment are provided to the same layer as that of the second electrodes 52. The third electrodes 53 are made of the same material as that of the second electrodes 52, that is, a translucent conductive material, such as ITO. Alternatively, the third electrodes 53 may be made of a metal material having desirable electric conductivity because they are provided at the positions overlapping with the decorative layer 101 as illustrated in FIG. 8. In this case, the third electrodes 53 may be made of a metal material including at least one of aluminum (Al), copper (Cu), silver (Ag), molybdenum (Mo), and an alloy of these metals.

The third electrodes 53 have a plurality of first portions 53a, 53b, 53c, and 53d and a plurality of second portions 53e and 53f. The first portions 53a, 53b, 53c, and 53d are provided along the first direction Dx. The second portions 53e and 53f are provided along the second direction Dy. As illustrated in FIG. 10, the first portions 53a, 53b, 53c, and 53d and the second portions 53e and 53f are electrically coupled to the detection IC 18 via respective wires L1 and the flexible substrate 71A. The second electrodes 52 are electrically coupled to the detection IC 18 via respective wires 37 and the flexible substrate 71A. The wires 37 pass through a gap between the first portions 53c and 53d and are coupled to the flexible substrate 71A.

The first portions 53a and 53b are provided along a long side of the frame area Gd and have a rectangular shape the long side of which extends along the first direction Dx. The first portions 53a and 53b are arranged side by side in the first direction Dx. The first portions 53a and 53b are arranged adjacent to a first end of the second electrodes 52. The first portions 53c and 53d are provided along another long side of the frame area Gd on the side opposite to that of the first portions 53a and 53b across the second electrodes 52. The first portions 53c and 53d are arranged side by side in the first direction Dx. The first portions 53c and 53d are arranged adjacent to a second end of the second electrodes 52.

The second portion 53e is provided along a short side of the frame area Gd. In other words, the second portion 53e is provided along the second direction Dy and arranged side by side with the second electrodes 52. The second portion 53e is arranged adjacent to a first end of the first electrodes 51 in planar view. The second portion 53f is provided along another short side of the frame area Gd on the side opposite to that of the second portion 53e across the second electrodes 52. The other configuration of the second portion 53f is the same as that of the second portion 53e.

As described above, the first portions 53a, 53b, 53c, and 53d and the second portions 53e and 53f are arranged in a manner surrounding the first electrodes 51 and the second electrodes 52 in planar view.

The third electrodes 53 according to the present embodiment serve as the detection electrodes in hover detection. In hover detection, the first electrode driver 14 supplies drive signals Vp simultaneously to all the first electrodes 51. As a result, lines of electric force Em2 in a fringe electric field extending from the first electrodes 51 to the third electrodes 53 are generated as illustrated in FIG. 12. By supplying the drive signals Vp to the first electrodes 51 in the whole display area Ad, the lines of electric force Em2 extend above the first surface 100a of the cover member 100 (not illustrated in FIG. 12). The drive signals Vp in hover detection are voltage signals having amplitude different from that of the drive signals Vcom in touch detection.

FIG. 12 also illustrates lines of electric force Em1 in a fringe electric field generated between the first electrodes 51 and the second electrodes 52 in mutual capacitance touch detection. The lines of electric force Em2 in hover detection extend farther away from the first surface 100a than the lines of electric force Em1 in mutual capacitance touch detection do. In self-capacitance touch detection, lines of electric force Es1 in an electric field generated from the first electrodes 51 extend upward from the first electrodes 51, and lines of electric force Es2 in an electric field generated from the second electrodes 52 extend upward from the second electrodes 52.

If the detected object positioned away from the first surface 100a by a predetermined distance blocks the lines of electric force Em2, capacitance C1a and C1b between the first electrodes 51 and the third electrodes 53 changes. The third electrodes 53 output the detection signals VdetC associated with the change in the capacitance C1a and C1b to the detection device 40 (refer to FIG. 1). The display apparatus 1 thus can perform what is called hover detection of detecting the detected object positioned away from the first surface 100a. In hover detection, the display apparatus 1 can detect the detected object positioned farther away from the first surface 100a in the direction perpendicular to the first surface 100a than in mutual capacitance touch detection. In other words, in hover detection, the first electrodes 51 correspond to the drive electrode E1 in the basic principle of mutual capacitance touch detection, and the third electrodes 53 correspond to the detection electrode E2.

The coordinate extractor 45 (refer to FIG. 2) compares the detection signals VdetC output from the first portions 53a, 53b, 53c, and 53d and the second portions 53e and 53f illustrated in FIG. 10, thereby calculating the position of the detected object in proximity to the first surface 100a. The coordinate extractor 45, for example, compares the detection signals VdetC output from the second portion 53e with those output from the second portion 53f, thereby calculating the position of the detected object in the first direction Dx. The coordinate extractor 45 compares the detection signals VdetC output from the first portions 53a and 53b with those output from the first portions 53c and 53d, thereby calculating the position of the detected object in the second direction Dy.

The first portions 53a and 53b according to the present embodiment are arranged side by side in the first direction Dx. With this configuration, the coordinate extractor 45 may compare the detection signals VdetC output from the first portion 53a with those output from the first portion 53b, thereby calculating the position of the detected object in the first direction Dx. The first portions 53c and 53d are arranged side by side in the first direction Dx. With this configuration, the coordinate extractor 45 may compare the detection signals VdetC output from the first portion 53c with those output from the first portion 53d, thereby calculating the position of the detected object in the first direction Dx.

The coordinate extractor 45 (refer to FIG. 2) can calculate a change in the position of the detected object positioned away from the first surface 100a by the predetermined distance to detect a gesture of the detected object. The detection controller 11A outputs control signals associated with the detected gesture to the display controller 11B. The display controller 11B performs a display operation associated with the gesture.

While two first portions 53a and 53b are provided on one long side of the frame area Gd according to the present embodiment, the present invention is not limited thereto.

The number of third electrodes 53 arranged on the sides of the frame area Gd may be changed as appropriate. Because the detection resolution in hover detection simply needs to be high enough to detect a gesture of the detected object, the resolution can be set lower than that in touch detection. As a result, the number of third electrodes 53 arranged on the sides of the frame area Gd can be made smaller than that of the first electrodes 51 or the second electrodes 52.

In the example illustrated in FIG. 10, the width of the first portions 53a, 53b, 53c, and 53d is smaller than that of the second portions 53e and 53f. This structure can make the long sides of the frame area Gd narrower. The present invention is not limited thereto, and the shapes of the first portions 53a, 53b, 53c, and 53d and the second portions 53e and 53f may be changed as appropriate. The first portions 53a, 53b, 53c, and 53d, for example, may have the same width and the same length as those of the second portions 53e and 53f.

In hover detection, the first electrode driver 14 preferably supplies the drive signals Vp to all the first electrodes 51. The present invention is not limited thereto, and the first electrode driver 14 may supply the drive signals Vp to part of the first electrodes 51. The first electrode driver 14, for example, may divide the first electrodes 51 arrayed in the second direction Dy into a plurality of blocks and supply the drive signals Vp in units of the blocks. While the first electrodes 51 are used as the drive electrodes in hover detection in the example illustrated in FIG. 12, the present invention is not limited thereto. The second electrode driver 15 may supply the drive signals Vp to the second electrodes 52 to perform hover detection based on a change in the capacitance between the second electrodes 52 and the third electrodes 53. In this case, the second electrode driver 15 may supply the drive signals Vp to all the second electrodes 52 or part of the second electrodes 52. Alternatively, the drive signals Vp may be supplied to both of the first electrodes 51 and the second electrodes 52.

Figure 13:
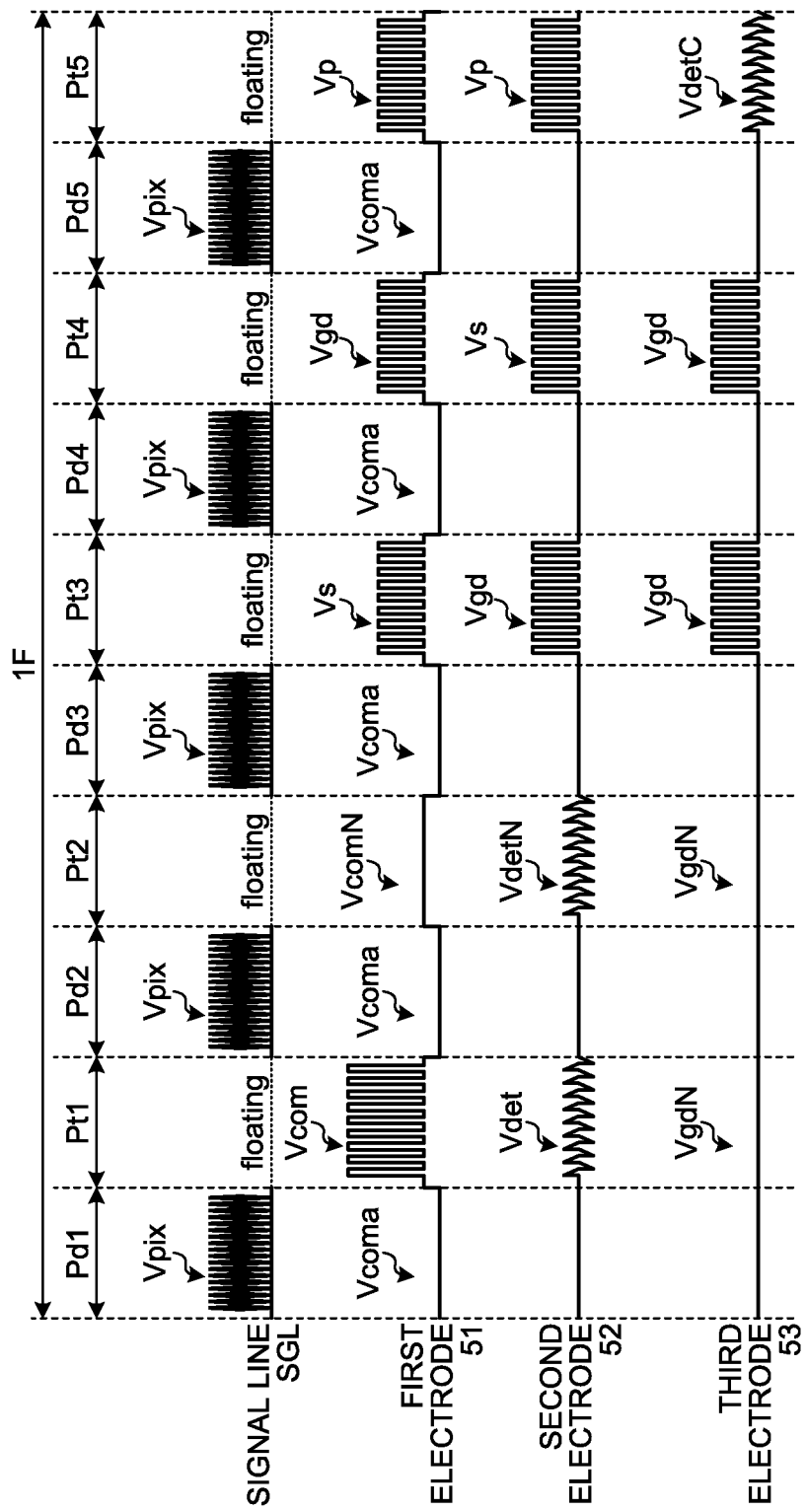
FIG. 13 is a timing waveform chart of an exemplary operation performed by the display apparatus according to the first embodiment.

The following describes an example of an operation method of the display apparatus 1 according to the present embodiment. FIG. 13 is a timing waveform chart of an exemplary operation performed by the display apparatus according to the first embodiment. In an example of the operation method of the display apparatus 1, the display apparatus 1 performs a touch detection operation (touch detection period), a hover detection operation (hover detection period), and a display operation (display period) in a time division manner. The display apparatus 1 may perform the touch detection operation, the hover detection operation, and the display operation in any division manner. The following describes a case where the display apparatus 1 performs the touch detection operation, the hover detection operation, and the display operation in a time division manner in one frame period (1F) of the display panel 10, that is, in a time required to display video information of one screen, for example.

As illustrated in FIG. 13, a plurality of display periods Pd1, Pd2, Pd3, Pd4, and Pd5 (they may be hereinafter referred to as display periods Pd) and a plurality of detection periods Pt1, Pt2, Pt3, Pt4, and Pt5 (they may be hereinafter referred to as detection periods Pt) are alternately arranged. The display periods Pd and the detection periods Pt are switched based on the control signals supplied from the display controller 11B (refer to FIG. 1).

As described above, in the display periods Pd, the display controller 11B supplies the pixel signals Vpix to the pixels Pix in a plurality of columns selected in the display periods Pd via the source driver 13 and the signal lines SGL. FIG. 13 illustrates video signals for respective colors of RGB. The display apparatus 1 selects sub-pixels SPix corresponding to the respective colors of RGB and supplies the video signals for the respective colors to the selected sub-pixels SPix, thereby performing an image display operation. The first electrodes 51 also serve as the common electrodes of the display panel 10. In the display periods Pd, the first electrode driver 14 supplies the drive signals Vcoma serving as a common potential for display drive to all the first electrodes 51 or the selected first electrodes 51 in the display area Ad.

In the detection period Pt1, touch detection is performed based on the basic principle of mutual capacitance touch detection described above. The display controller 11B outputs the control signals to the first electrode driver 14. The first electrode driver 14 supplies the touch detection drive signals Vcom to the first electrodes 51. Based on the basic principle of mutual capacitance touch detection described above, the second electrodes 52 output the detection signals Vdet associated with a change in the capacitance generated between the first electrodes 51 and the second electrodes 52. The detection device 40 determines whether touch input is performed on the display area Ad and calculates the coordinates of the input position based on the detection signals Vdet. While FIG. 13 illustrates only one detection period Pt1, a plurality of detection periods Pt1 may be provided in one frame period.

In the detection periods Pt, the signal lines SGL may be in a floating state where no voltage signal is supplied thereto and their electric potential is not fixed. This mechanism suppresses capacitive coupling between the first electrodes 51 and the signal lines SGL and reduces stray capacitance. Consequently, the display apparatus 1 can suppress reduction in the detection sensitivity in touch detection. In the detection periods Pt, the gate lines GCL (refer to FIG. 9) may also be in a floating state.

In the detection period Pt1, the third electrode driver 16 supplies guard signals VgdN to the third electrodes 53. The guard signals VgdN are DC voltage signals having the same electric potential as that of the second electrodes 52, for example. As a result, the third electrodes 53 serve as shield electrodes. The third electrodes 53 suppress noise generated from the gate scanner circuits 12A and various kinds of wiring included in the TFT layer 24 (refer to FIG. 8), thereby reducing stray capacitance in the second electrodes 52. As illustrated in FIG. 8, the third electrodes 53 are provided on the upper side of the first substrate 21 provided with the gate scanner circuits 12A, the first electrode scanner circuits 14A, and various kinds of wiring. In other words, the third electrodes 53 are provided at the positions overlapping with the gate scanner circuits 12A and the first electrode scanner circuits 14A in planar view. With this configuration, the third electrodes 53 are arranged between the detected object and the gate scanner circuits 12A, for example. The third electrodes 53 may be coupled to the ground and in a grounded state in the detection periods Pt.

The detection period Pt2 is a noise detection period. The first electrode driver 14 stops supplying the drive signals Vcom to the first electrodes 51 and supplies DC voltage signals VcomN having a fixed electric potential. The second electrodes 52 output noise signals VdetN intruding from the outside to the detection device 40. The detection device 40 derives information on the noise, such as the frequency and the amplitude of the noise signals VdetN. Based on the information on the noise, the detection controller 11A can control the detection operations. The detection controller 11A, for example, may change the frequency and the amplitude of the drive signals Vcom or change the frequency at which the display operations and the detection operations are repeatedly performed.

Also in the detection period Pt2, the third electrode driver 16 supplies the guard signals VgdN to the third electrodes 53. As a result, the third electrodes 53 serve as noise shield electrodes. The third electrodes 53 suppress noise generated from the gate scanner circuits 12A and various kinds of wiring included in the TFT layer 24 (refer to FIG. 8). Consequently, the display apparatus 1 can accurately detect noise caused by the external environment.

In the detection periods Pt3 and Pt4, touch detection is performed based on the basic principle of self-capacitance touch detection described above. In the detection period Pt3, the first electrode driver 14 supplies the drive signals Vs to the first electrodes 51. The first electrodes 51 output the detection signals VdetB associated with a change in the capacitance to the detection device 40 via the first electrode driver 14. In the detection period Pt4, the second electrode driver 15 supplies the drive signals Vs to the second electrodes 52. The second electrodes 52 output the detection signals VdetA associated with a change in the capacitance to the detection device 40 via the second electrode driver 15. The detection device 40 determines whether touch input is performed on the display area Ad and calculates the coordinates of the input position based on the detection signals VdetA and VdetB. The display apparatus 1 thus can perform self-capacitance touch detection.

In the detection period Pt3, the second electrode driver 15 supplies guard signals Vgd to the second electrodes 52. The third electrode driver 16 supplies the guard signals Vgd to the third electrodes 53. The guard signals Vgd are voltage signals having the same amplitude and the same frequency as those of the drive signals Vs and synchronized with the drive signals Vs. As a result, the second electrodes 52 and the third electrodes 53 are driven in synchronization with and at the same electric potential as that of the first electrodes 51. This mechanism suppresses stray capacitance between the first electrodes 51 and the second electrodes 52 and stray capacitance between the first electrodes 51 and the third electrodes 53. In other words, in the detection period Pt3, the second electrodes 52 and the third electrodes 53 serve as shield electrodes for the first electrodes 51. Similarly, in the detection period Pt4, the first electrode driver 14 supplies the guard signals Vgd to the first electrodes 51. The third electrode driver 16 supplies the guard signals Vgd to the third electrodes 53. In the detection period Pt4, the first electrodes 51 and the third electrodes 53 serve as shield electrodes for the second electrodes 52. Consequently, the display apparatus 1 can suppress reduction in the detection accuracy in touch detection in the detection periods Pt3 and Pt4.

In the detection period Pt5, a hover detection operation is performed based on the basic principle of mutual capacitance touch detection described above. In the detection period Pt5, the first electrode driver 14 supplies the drive signals Vp to the first electrodes 51. The second electrode driver 15 supplies the drive signals Vp to the second electrodes 52. The first electrode driver 14 and the second electrode driver 15 may supply the drive signals Vp to all the first electrodes 51 and all the second electrodes 52, respectively, or to part of the first electrodes 51 or part of the second electrodes 52. The third electrodes 53 output, to the detection device 40, the detection signals VdetC associated with a change in the capacitance between the first electrodes 51 and the third electrodes 53 and a change in the capacitance between the second electrodes 52 and the third electrodes 53. The detection device 40 can determine whether the detected object is in proximity to the first surface 100a and detect a gesture, such as a change in the position, of the detected object based on the detection signals VdetC.

While the drive signals Vp are supplied to both of the first electrodes 51 and the second electrodes 52 in FIG. 13, the present invention is not limited thereto. The drive signals Vp may be supplied to one of the first electrodes 51 and the second electrodes 52. The first electrode driver 14, for example, may supply the drive signals Vp to the first electrodes 51, and the second electrode driver 15 may supply no drive signal Vp to the second electrodes 52, thereby making the second electrodes 52 into a floating state. Alternatively, the second electrode driver 15 may supply the drive signals Vp to the second electrodes 52, and the first electrode driver 14 may supply no drive signal Vp to the first electrodes 51, thereby making the first electrodes 51 into a floating state.

In the detection period Pt5, guard signals having the same amplitude and the same frequency as those of the drive signals Vp and synchronized with the drive signals Vp may be supplied to peripheral circuits, such as the gate scanner circuits 12A (refer to FIG. 8) and the wires 12L in the TFT layer 24. This mechanism reduces stray capacitance between the peripheral circuits and various kinds of wiring included in the TFT layer 24 and the third electrodes 53. Consequently, the display apparatus 1 can suppress reduction in the detection accuracy.

As described above, the display apparatus 1 performs the display operations and the detection operations in a time division manner in one frame period 1F. While the detection operations in the respective detection periods Pt are each performed once in one frame period 1F in the example illustrated in FIG. 13, the number of times of detection operations may be changed as appropriate. The detection operations in the respective detection periods Pt, for example, may be each performed twice or more in one frame period 1F. Alternatively, any of the detection operations in the respective detection periods Pt is not necessarily be performed in one frame period 1F.

As described above, the display apparatus 1 according to the present embodiment includes the first substrate 21, the second substrate 31, the liquid crystal layer 6 (display functional layer), the first electrodes 51, the second electrodes 52, the third electrodes 53, and the first electrode driver 14 or the second electrode driver 15 (drive circuit). The second substrate 31 faces the first substrate 21. The liquid crystal layer 6 is provided between the first substrate 21 and the second substrate 31 and used to display an image in the display area Ad. The first electrodes 51 are provided in the display area Ad between the first substrate 21 and the second substrate 31. The second electrodes 52 are provided facing the first electrodes 51 in the display area Ad on the surface of the second substrate 31. The third electrodes 53 are provided in the frame area Gd on the outer side of the display area Ad on the surface of the second substrate 31. The first electrode driver 14 or the second electrode driver 15 supplies the drive signals Vp (first drive signals) to at least one of the first electrodes 51 and the second electrodes 52. The display apparatus 1 performs a hover detection operation of detecting a detected object in proximity to the second substrate 31 based on the detection signals VdetC (first detection signals) output from the third electrodes 53 based on a change in the capacitance between the third electrodes 53 and at least one of the first electrodes 51 and the second electrodes 52.

The display apparatus 1 includes not only the first electrodes 51 and the second electrodes 52 used for touch detection but also the third electrodes 53 serving as the detection electrodes in hover detection. With this configuration, the display apparatus 1 can perform accurate hover detection while suppressing reduction in the detection performance in touch detection. Specifically, in hover detection, the first electrode driver 14 supplies the drive signals Vp to all the first electrodes 51 simultaneously. As a result, the lines of electric force Em2 in the fringe electric field extend above the detection surface 100a as illustrated in FIG. 12, thereby detecting the detected object positioned away from the detection surface 100a. The first electrodes 51 serve not only as the drive electrodes in touch detection but also as the drive electrodes in hover detection. The second electrodes 52 serve not only as the detection electrodes in touch detection but also as the drive electrodes in hover detection. Specifically, in hover detection, the first electrode driver 14 supplies the drive signals Vp to all the first electrodes 51, and the second electrode driver 15 supplies the drive signals Vp to the second electrodes 52 simultaneously. As a result, the lines of electric force Em2 in the fringe electric field further extend above the detection surface 100a as illustrated in FIG. 12, thereby detecting the detected object positioned further away from the detection surface 100a. As described above, part or all of the first electrodes 51 and the second electrodes 52 used for touch detection also serve as the drive electrodes in hover detection. Consequently, the configuration of the display apparatus 1 can be simplified.

Second Embodiment

Figure 14:
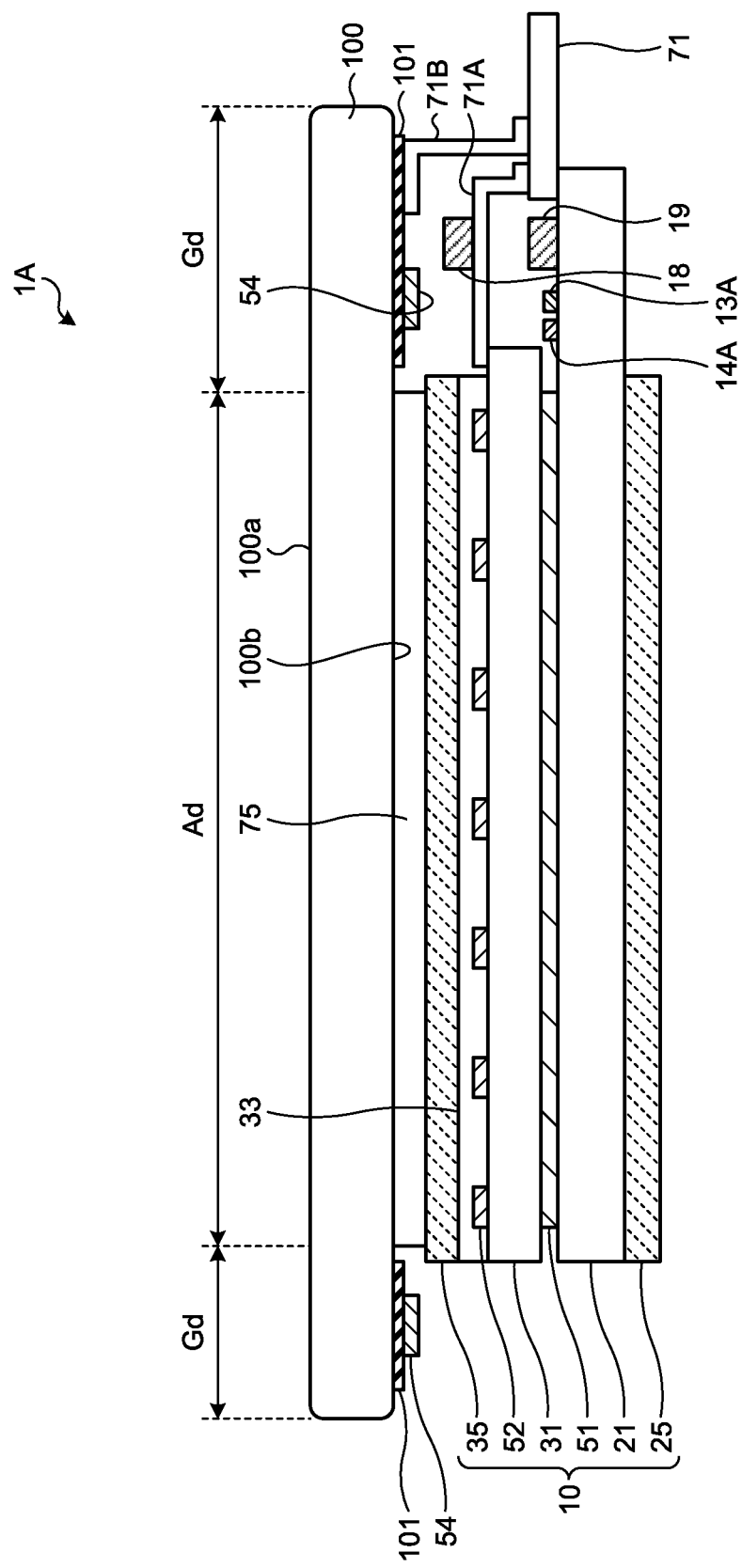
FIG. 14 is a sectional view of a schematic sectional structure of the display apparatus according to a second embodiment of the present invention.

FIG. 14 is a sectional view of a schematic sectional structure of the display apparatus according to a second embodiment of the present invention. As illustrated in FIG. 14, a display apparatus 1A according to the present embodiment includes third electrodes 54 provided on the second surface 100b of the cover member 100. In the frame area Gd, the decorative layer 101 is provided on the second surface 100b of the cover member 100, and the third electrodes 54 are provided on the decorative layer 101 on the display panel 10 side. A flexible substrate 71B is coupled to the second surface 100b of the cover member 100. The flexible substrate 71B is also coupled to the flexible substrate 71 provided on the first substrate 21. The third electrodes 54 are electrically coupled to the detection IC 18 mounted on the flexible substrate 71 via the flexible substrate 71B. With this configuration, the third electrodes 54 output the detection signals VdetC to the detection IC 18.

Figure 15:
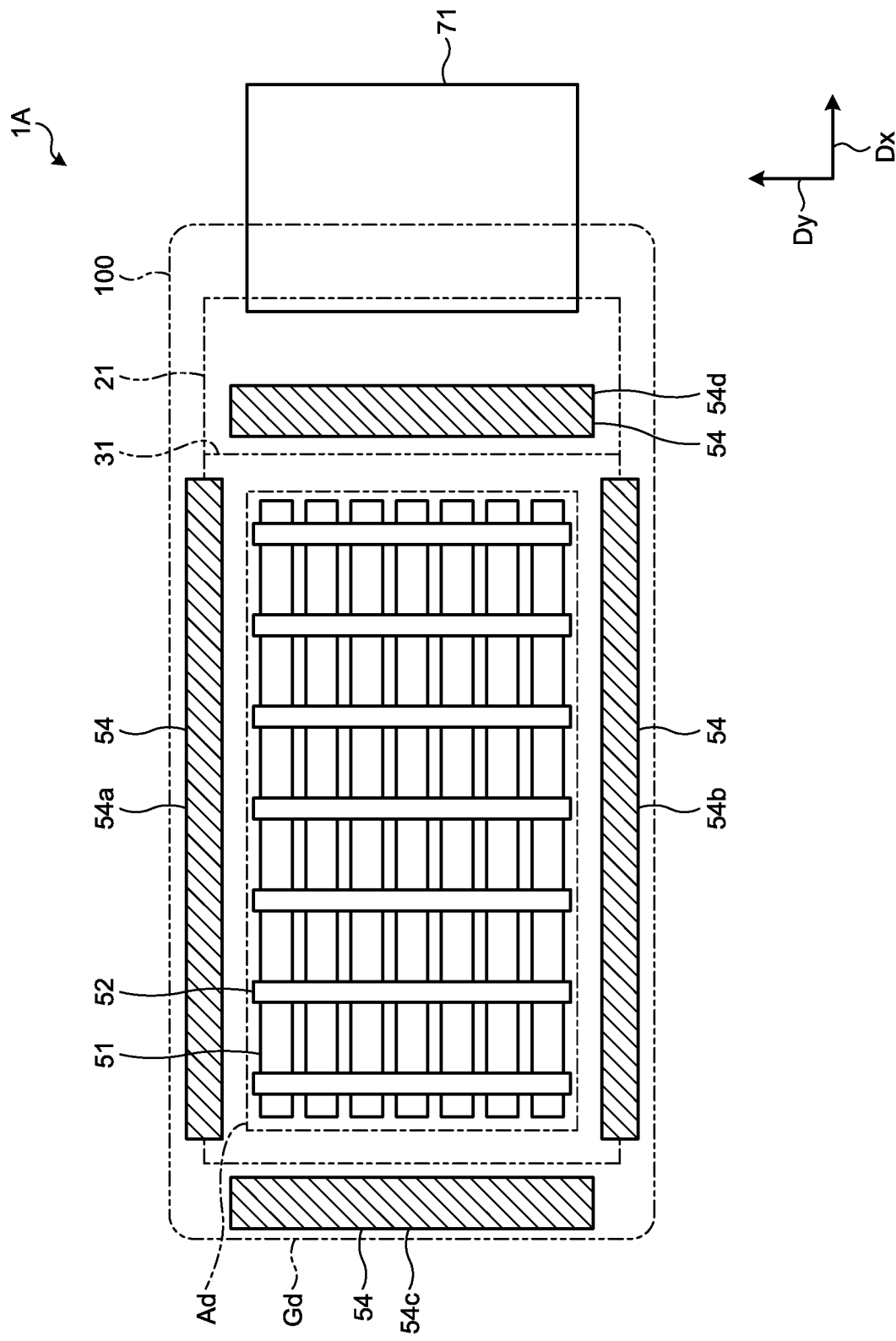
FIG. 15 is a plan view schematically illustrating the relation among the first electrodes, the second electrodes, and the third electrodes according to the second embodiment.
Figure 16:
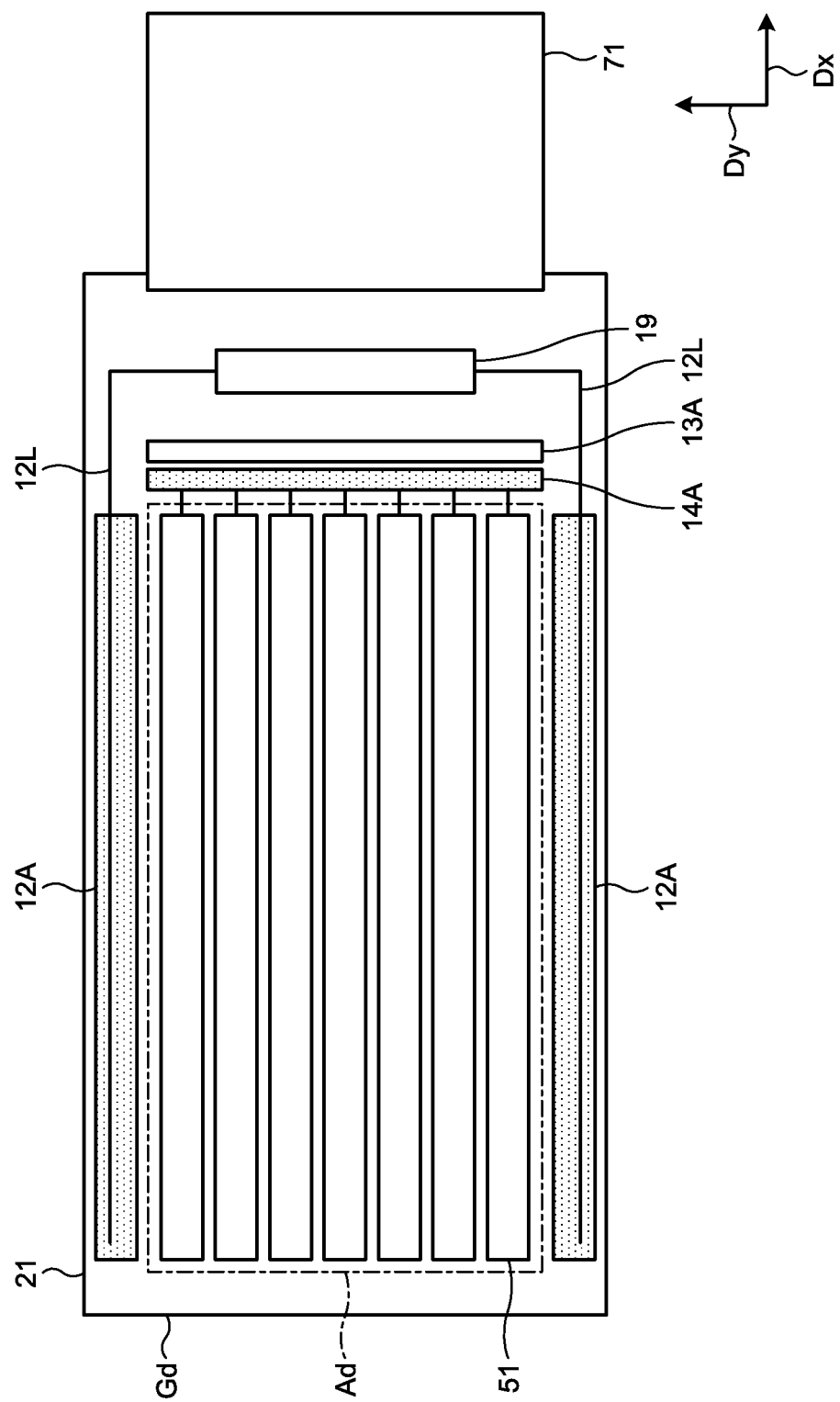
FIG. 16 is a plan view for explaining the configuration of the first electrodes provided to the first substrate according to the second embodiment.
Figure 17:
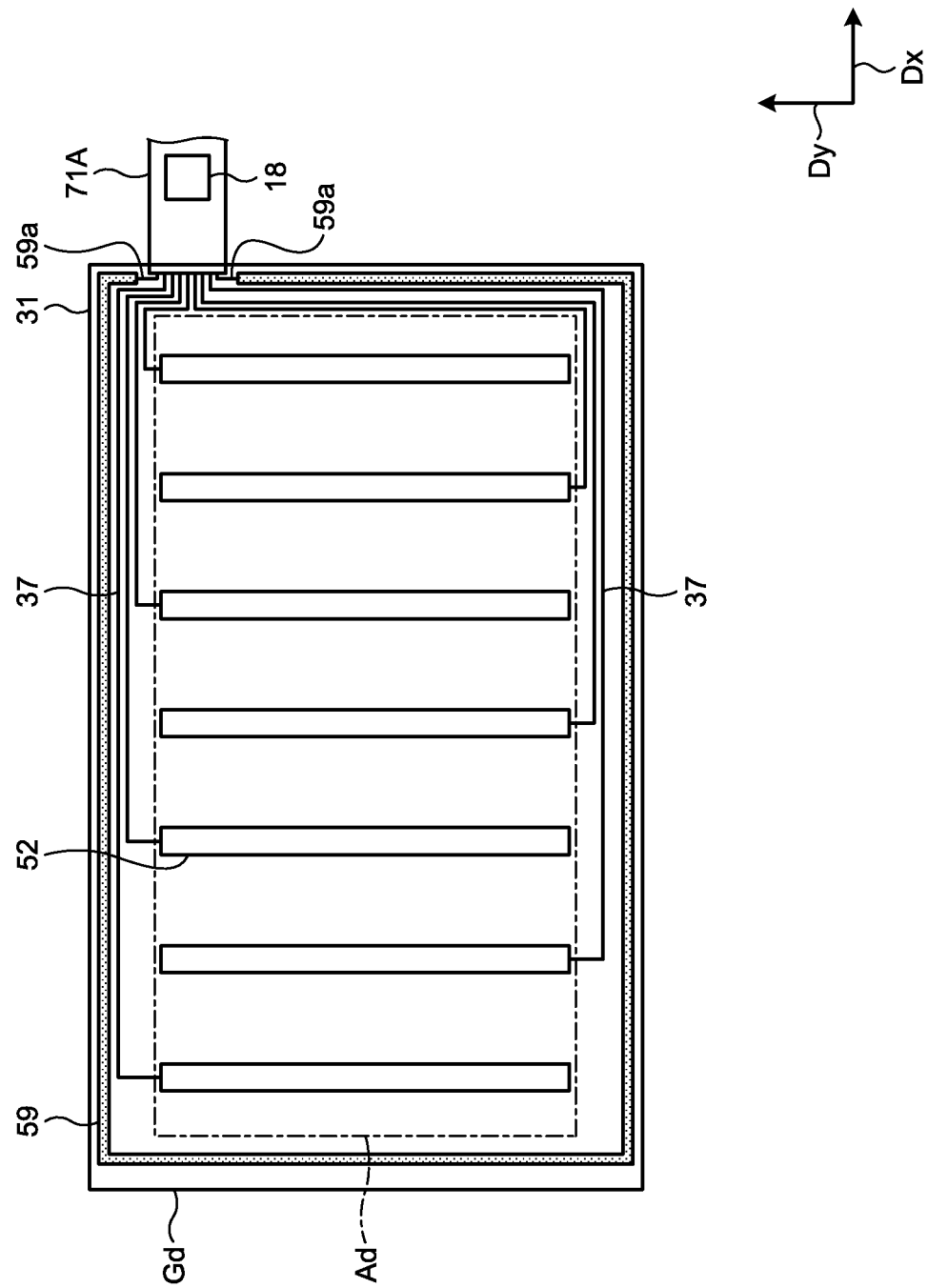
FIG. 17 is a plan view for explaining the configuration of the second electrodes provided to a second substrate according to the second embodiment.
Figure 18:
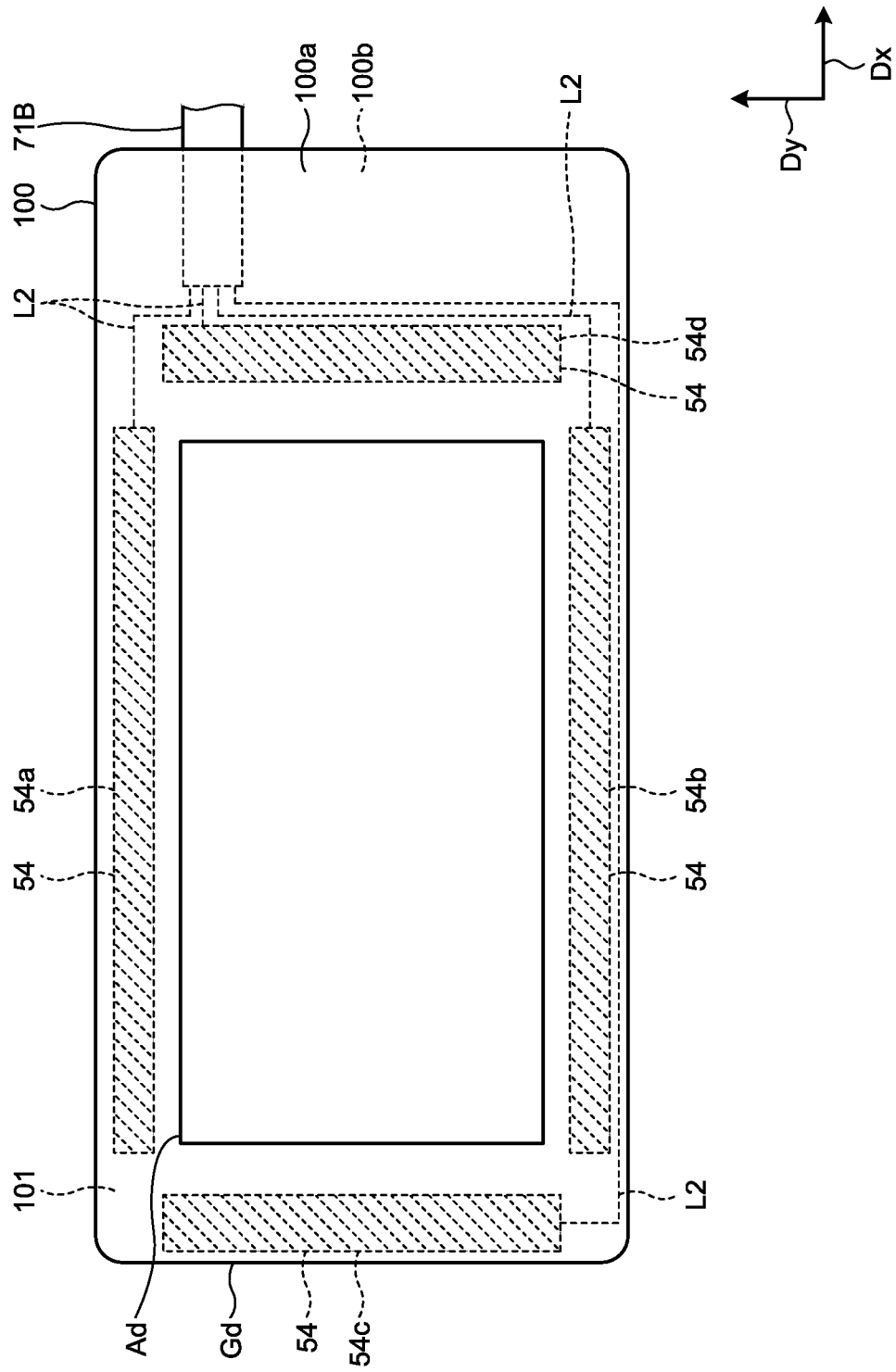
FIG. 18 is a plan view for explaining the configuration of the third electrodes provided to a cover member according to the second embodiment.

FIG. 15 is a plan view schematically illustrating the relation among the first electrodes, the second electrodes, and the third electrodes according to the second embodiment. FIG. 16 is a plan view for explaining the configuration of the first electrodes provided to the first substrate according to the second embodiment. FIG. 17 is a plan view for explaining the configuration of the second electrodes provided to the second substrate according to the second embodiment. FIG. 18 is a plan view for explaining the configuration of the third electrodes provided to the cover member according to the second embodiment.

As illustrated in FIGS. 15 and 16, the first electrodes 51 have the same configuration as that of the first embodiment. As illustrated in FIG. 16, the first electrode scanner circuit 14A, the multiplexer 13A, the display IC 19, and the flexible substrate 71 are coupled to a short side of the frame area Gd of the first substrate 21. The first electrode scanner circuit 14A and the multiplexer 13A are arranged between the first electrodes 51 and the flexible substrate 71. The first electrodes 51 according to the present embodiment are provided along a direction parallel to the signal lines SGL illustrated in FIG. 9 and intersect with the gate lines GCL. The display IC 19 and the flexible substrate 71 may be coupled to a long side of the frame area Gd of the first substrate 21 similarly to the first embodiment.

As illustrated in FIG. 17, the second electrodes 52 have the same configuration as that of the first embodiment. The second electrodes 52 are coupled, via the respective wires 37, to the flexible substrate 71A coupled to the short side of the frame area Gd. As described above, the third electrodes 54 are provided to the cover member 100. Consequently, the third electrodes 54 are not provided to the frame area Gd of the second substrate 31. As illustrated in FIG. 14, the flexible substrate 71A is coupled to the flexible substrate 71 coupled to the first substrate 21. With this configuration, the detection signals Vdet and the noise signals VdetN (refer to FIG. 13) and other signals output from the second electrodes 52 are supplied to the detection IC 18 via the flexible substrate 71A and the flexible substrate 71.

The frame area Gd of the second substrate 31 may be provided with a guard electrode 59 surrounding the second electrodes 52. The guard electrode 59 is one continuous electrode and has a frame shape surrounding the second electrodes 52. The structure of the guard electrode 59 is not limited thereto, and the guard electrode 59 may be composed of a plurality of portions like the third electrodes 53. The guard electrode 59 is electrically coupled to the detection IC 18 via wires 59a and the flexible substrate 71A. The wires 37 coupled to the respective second electrodes 52 pass through a gap between the ends of the guard electrode 59 and are coupled to the flexible substrate 71A. In mutual capacitance touch detection (refer to the detection period Pt1 in FIG. 13), the guard electrode 59 is supplied with the guard signals VgdN having the same electric potential as that of the second electrodes 52, for example. As a result, the guard electrode 59 serves as a noise shield electrode and suppresses noise generated from the gate scanner circuits 12A and various kinds of wiring included in the TFT layer 24 (refer to FIG. 8).

As illustrated in FIGS. 15 and 18, the third electrodes 54 are provided in the frame area Gd of the cover member 100 serving as a plane parallel to the second substrate 31. In other words, the third electrodes 54 according to the present embodiment are provided to a layer different from that of the second electrodes 52. As illustrated in FIG. 14, the third electrodes 54 are provided on the upper side of the first substrate 21 provided with the first electrode scanner circuit 14A, the multiplexer 13A, and various kinds of wiring. In other words, the third electrodes 54 are provided at the positions overlapping with the first electrode scanner circuit 14A and the multiplexer 13A in planar view. With this configuration, the third electrodes 54 are arranged between the detected object and the first electrode scanner circuit 14A, for example. As illustrated in FIG. 15, the third electrodes 54 are provided in a manner surrounding the first electrodes 51 and the second electrodes 52 in planar view. FIG. 18 is a plan view of the cover member 100 viewed from the first surface 100a side.

The third electrodes 54 have a plurality of first portions 54a and 54b and a plurality of second portions 54c and 54d. The first portions 54a and 54b are provided along the first direction Dx. The second portions 54c and 54d are provided along the second direction Dy. The first portions 54a and 54b and the second portions 54c and 54d are coupled to the flexible substrate 71B provided to the frame area Gd via respective wires L2. As described above, the first portions 54a and 54b and the second portions 54c and 54d are coupled to the detection IC 18.

The first portion 54a is provided along a long side of the frame area Gd. The first portion 54a is arranged adjacent to a first end of the second electrodes 52. The first portion 54b is provided along another long side of the frame area Gd on the side opposite to that of the first portion 54a across the second electrodes 52. The first portion 54b is arranged adjacent to a second end of the second electrodes 52.

The second portion 54c is provided along a short side of the frame area Gd. The second portion 54c is arranged side by side with the second electrodes 52 and adjacent to a first end of the first electrodes 51 in planar view. The second portion 54d is provided along another short side of the frame area Gd on the side opposite to that of the second portion 54c across the second electrodes 52. The second portion 54d is arranged adjacent to a second end of the first electrodes 51 in planar view.

As described above, the first portions 54a and 54b and the second portions 54c and 54d are arranged in a manner surrounding the first electrodes 51 and the second electrodes 52 in the display area Ad in planar view.

The third electrodes 54 according to the present embodiment serve as the detection electrodes in hover detection. In the detection period Pt1, mutual capacitance touch detection is performed based on a change in the capacitance between the first electrodes 51 and the second electrodes 52 similarly to the timing waveform chart illustrated in FIG. 13. In the detection period Pt2, noise detection is performed based on the basic principle of mutual capacitance touch detection. In the detection periods Pt3 and Pt4, the first electrodes 51 and the second electrodes 52 serve as the detection electrodes to perform self-capacitance touch detection. In the detection period Pt5, a hover detection operation is performed based on the basic principle of mutual capacitance touch detection.

In the detection period Pt5, the first electrode driver 14 supplies the drive signals Vp to the first electrodes 51. The second electrode driver 15 supplies the drive signals Vp to the second electrodes 52. The first electrode driver 14 and the second electrode driver 15 may supply the drive signals Vp to all the first electrodes 51 and all the second electrodes 52, respectively, or to part of the first electrodes 51 or part of the second electrodes 52. The third electrodes 54 output, to the detection device 40, the detection signals VdetC associated with a change in the capacitance between the first electrodes 51 and the third electrodes 54 and a change in the capacitance between the second electrodes 52 and the third electrodes 54. The detection device 40 can determine whether the detected object is in proximity to the first surface 100a and detect a gesture, such as a change in the position, of the detected object based on the detection signals VdetC.

The third electrodes 54 according to the present embodiment are provided to a layer different from that of the second electrodes 52, that is, to the cover member 100. This configuration can reduce restrictions caused by the second electrodes 52 and the wires 37, thereby increasing the flexibility in the shape and the position of the third electrodes 54. The third electrodes 54 are not provided to the second substrate 31. This configuration can make the frame area Gd of the second substrate 31 narrower.

While the first portions 54a and 54b and the second portions 54c and 54d according to the present embodiment are arranged on the respective sides of the frame area Gd, the present invention is not limited thereto. Similarly to the first embodiment, two or more electrodes may be provided on each side of the frame area Gd. This configuration can increase the resolution in hover detection in the direction along each side of the frame area Gd, thereby accurately detecting a gesture of the detected object. The shapes of the first portions 54a and 54b and the second portions 54c and 54d may be changed as appropriate.

Third Embodiment

Figure 19:
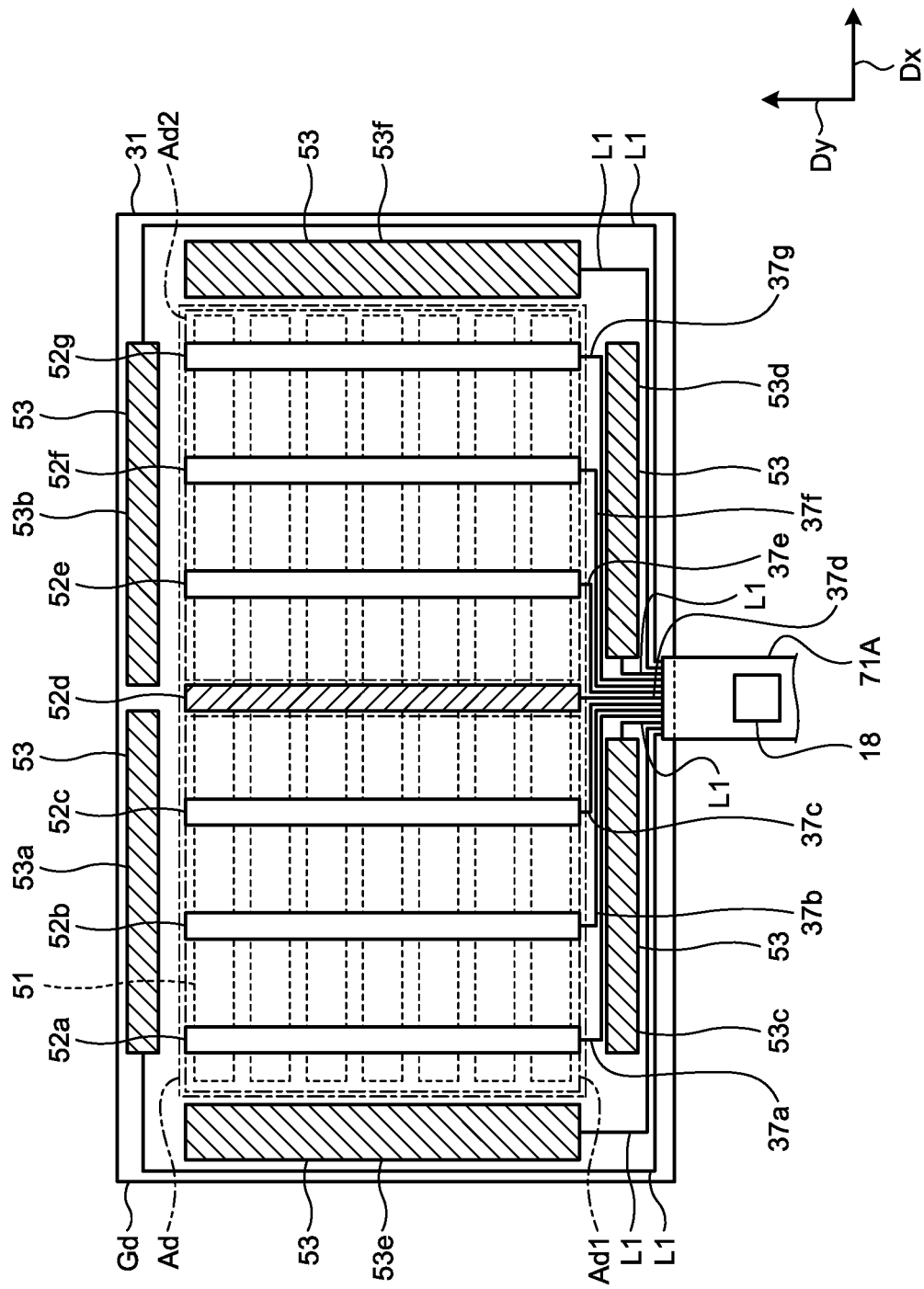
FIG. 19 is a plan view for explaining the configuration of the first electrodes, the second electrodes, and the third electrodes according to a third embodiment of the present invention.
Figure 20:
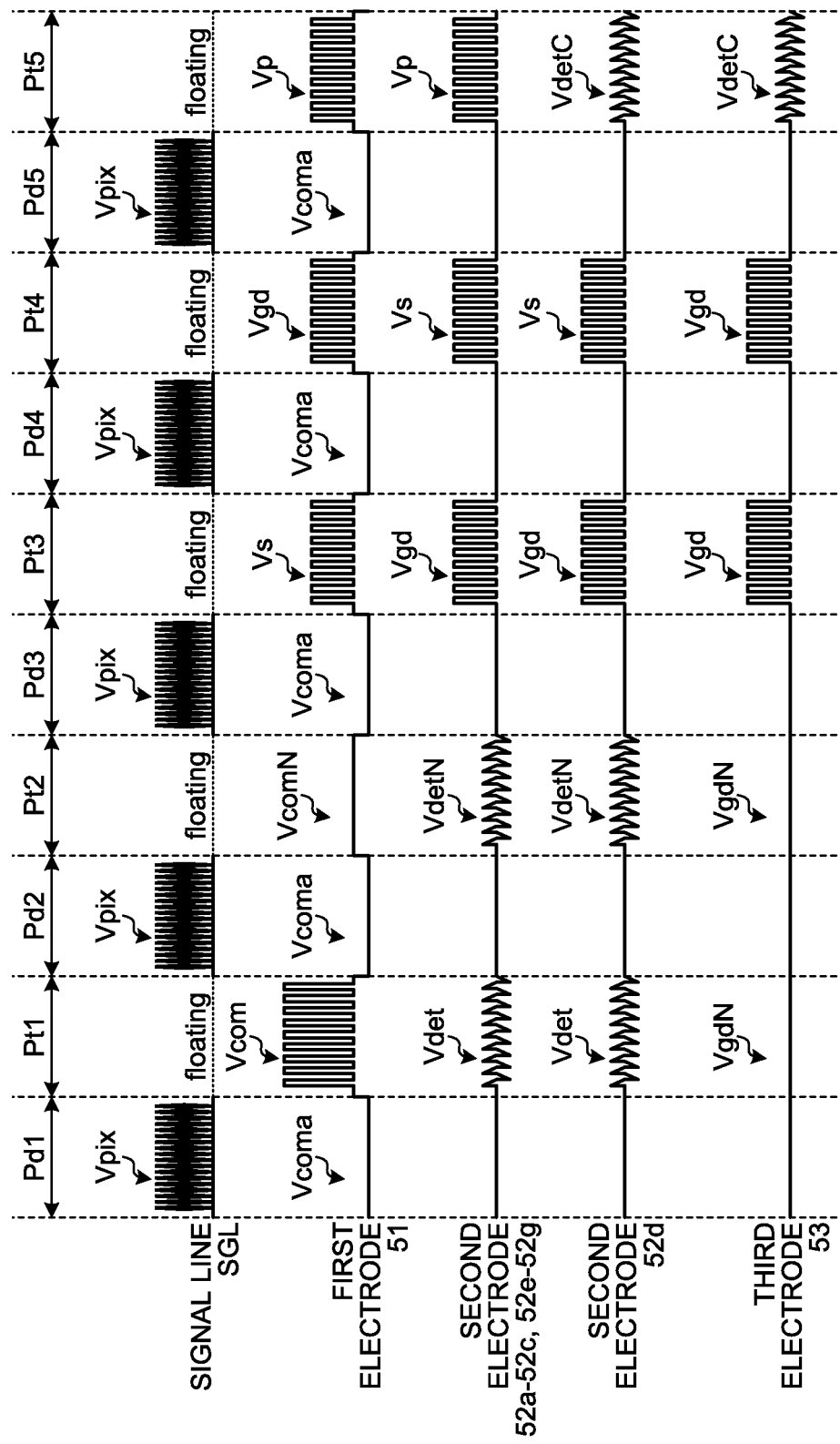
FIG. 20 is a timing waveform chart of an exemplary operation performed by the display apparatus according to the third embodiment.

FIG. 19 is a plan view for explaining the configuration of the first electrodes, the second electrodes, and the third electrodes according to a third embodiment of the present invention. FIG. 20 is a timing waveform chart of an exemplary operation performed by the display apparatus according to the third embodiment.

As illustrated in FIG. 19, the configuration of the first electrodes 51, second electrodes 52a to 52g, and the third electrodes 53 is the same as that of the first electrodes 51, the second electrodes 52, and the third electrodes 53 according to the first embodiment illustrated in FIGS. 10 and 11. The first electrodes 51 serve as the drive electrodes in mutual capacitance touch detection and hover detection and the detection electrodes in self-capacitance touch detection. The second electrodes 52a to 52g serve as the detection electrodes in mutual capacitance touch detection and the detection electrodes in self-capacitance touch detection. The second electrodes 52a to 52g are electrically coupled to the detection IC 18 via wires 37a to 37g, respectively, and the flexible substrate 71A. The third electrodes 53 serve as the detection electrodes in hover detection. In the present embodiment, the second electrode 52d arranged at the center in the first direction Dx out of the second electrodes 52a to 52g arrayed in the first direction Dx serves as the detection electrode in hover detection.

Specific operations are as follows. As illustrated in FIG. 20, in the detection period Pt1, mutual capacitance touch detection is performed. The second electrodes 52a to 52g output the detection signals Vdet associated with a change in the capacitance between the first electrodes 51 and the second electrodes 52a to 52g to serve as the detection electrodes. In the detection period Pt2, the second electrodes 52a to 52g output the noise signals VdetN intruding from the outside to serve as the detection electrodes for noise detection. In the detection period Pt3, self-capacitance touch detection is performed. The second electrodes 52a to 52g are supplied with the guard signals Vgd to serve as the shield electrodes for the first electrodes 51. In the detection period Pt4, self-capacitance touch detection is performed. The second electrodes 52a to 52g are supplied with the drive signals Vs and output the detection signals VdetB associated with a change in the capacitance of the second electrodes 52a to 52g to serve as the detection electrodes.

In the detection period Pt5, the second electrode driver 15 supplies the drive signals Vp to the second electrodes 52a to 52c and 52e to 52g serving not as the detection electrodes but as the drive electrodes out of the second electrodes 52a to 52g. The first electrode driver 14 supplies the drive signals Vp to the first electrodes 51. The second electrode 52d outputs the detection signals VdetC associated with a change in the capacitance between the first electrodes 51 and the second electrode 52d and a change in the capacitance between the second electrodes 52a to 52c and 52e to 52g and the second electrode 52d. The third electrodes 53 output the detection signals VdetC associated with a change in the capacitance between the first electrodes 51 and the third electrodes 53 and a change in the capacitance between the second electrodes 52a to 52c and 52e to 52g and the third electrodes 53.

The detection device 40 can determine whether the detected object is in proximity to the first surface 100a and detect a gesture, such as a change in the position, of the detected object based on the detection signals VdetC output from the second electrode 52d and the third electrodes 53.

As illustrated in FIG. 19, the display area Ad has a first area Ad1 and a second area Ad2 separated by the second electrode 52d. The first area Ad1 and the second area Ad2 are arranged side by side in the first direction Dx with the second electrode 52d interposed therebetween. The second electrodes 52a to 52c serving as the drive electrodes in the detection period Pt5 are provided to the first area Ad1 and surrounded by the first portions 53a and 53c, the second portion 53e, and the second electrode 52d. The second electrodes 52e to 52g serving as the drive electrodes in the detection period Pt5 are provided to the second area Ad2 and surrounded by the first portions 53b and 53d, the second portion 53f, and the second electrode 52d.

The detection device 40 can calculate the position of the detected object in proximity to the first area Ad1 based on the detection signals VdetC output from the first portions 53a and 53c, the second portion 53e, and the second electrode 52d. The detection device 40 can calculate the position of the detected object in proximity to the second area Ad2 based on the detection signals VdetC output from the first portions 53b and 53d, the second portion 53f, and the second electrode 52d.

The second electrode 52d according to the present embodiment serves as the detection electrode in hover detection. This configuration can facilitate calculation of the position of the detected object in proximity to the first surface 100a, thereby increasing the accuracy in detection of a gesture.

While one second electrode 52d positioned at the center in the first direction Dx is used as the detection electrode in hover detection in the example illustrated in FIG. 19, the present invention is not limited thereto. Two or more second electrodes 52 positioned at the center out of the second electrodes 52, for example, may be used as the detection electrodes. While the drive signals Vp are supplied to the first electrodes 51 and the second electrodes 52a to 52c and 52e to 52g in the detection period Pt5 as illustrated in FIG. 20, the present invention is not limited thereto. The drive signals Vp may be supplied to at least one of the first electrodes 51 and the second electrodes 52a to 52c and 52e to 52g. The first electrode driver 14, for example, may supply the drive signals Vp to the first electrodes 51, and the second electrode driver 15 may make the second electrodes 52a to 52c and 52e to 52g into a floating state. Alternatively, the second electrode driver 15 may supply the drive signals Vp to the second electrodes 52a to 52c and 52e to 52g, and the first electrode driver 14 may make the first electrodes 51 into a floating state.

Fourth Embodiment

Figure 21:
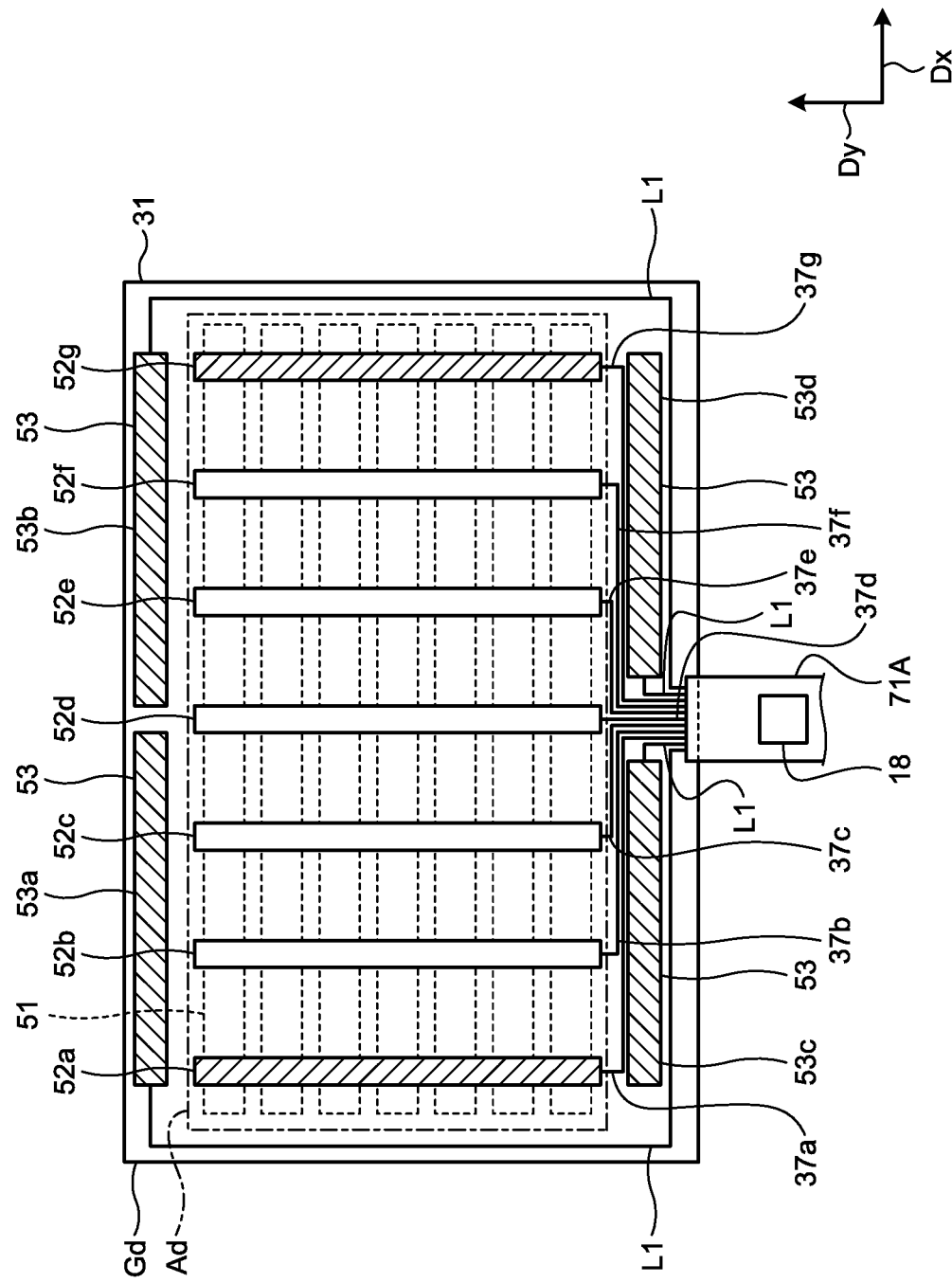
FIG. 21 is a plan view for explaining the configuration of the first electrodes, the second electrodes, and the third electrodes according to a fourth embodiment of the present invention.
Figure 22:
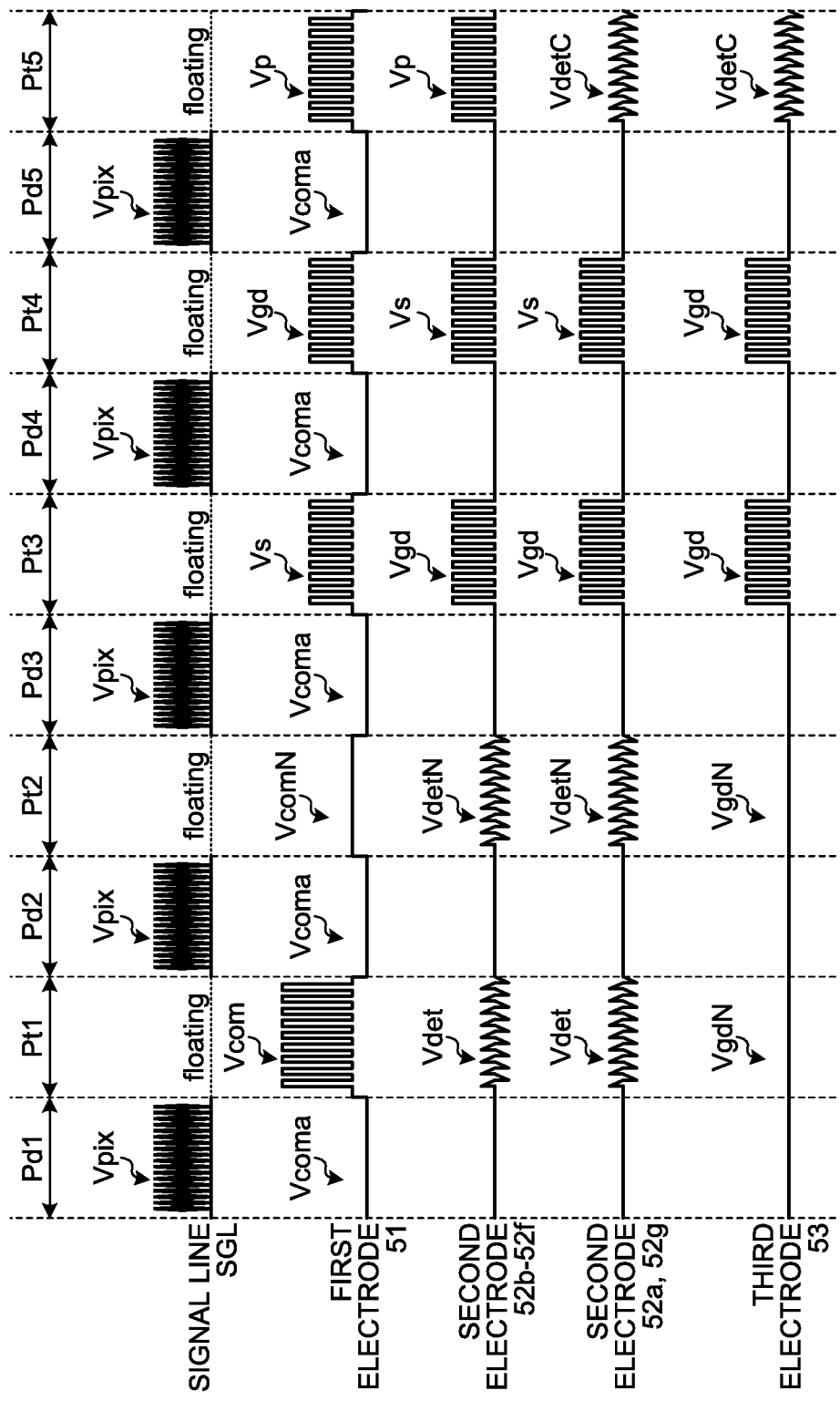
FIG. 22 is a timing waveform chart of an exemplary operation performed by the display apparatus according to the fourth embodiment.

FIG. 21 is a plan view for explaining the configuration of the first electrodes, the second electrodes, and the third electrodes according to a fourth embodiment of the present invention. FIG. 22 is a timing waveform chart of an exemplary operation performed by the display apparatus according to the fourth embodiment. In the present embodiment, the second electrodes 52a and 52g arranged on the outer sides in the first direction Dx out of the second electrodes 52a to 52g serve as the detection electrodes in hover detection. The second electrodes 52b to 52f serving as the drive electrodes in hover detection are surrounded by the first portions 53a to 53d and the second electrodes 52a and 52g. The third electrodes 53 include the first portions 53a to 53d, and the second portions 53e and 53f illustrated in FIG. 10 and other drawings are not provided. This configuration can make the short sides of the frame area Gd, that is, the parts along the second electrodes 52a and 52g narrower.

As illustrated in FIG. 22, in the detection period Pt1, the second electrodes 52b to 52f and the second electrodes 52a and 52g (hereinafter, the second electrodes 52b to 52f and the second electrodes 52a and 52g are referred to as the second electrodes 52a to 52g) serve as the detection electrodes in mutual capacitance touch detection similarly to the embodiments above. In the detection period Pt2, the second electrodes 52a to 52g serve as the detection electrodes for noise detection. In the detection period Pt3, the second electrodes 52a to 52g serve as the shield electrodes for the first electrodes 51 in self-capacitance touch detection. In the detection period Pt4, the second electrodes 52a to 52g serve as the detection electrodes in self-capacitance touch detection.

In the detection period Pt5, the second electrode driver 15 supplies the drive signals Vp to the second electrodes 52b to 52f serving not as the detection electrodes but as the drive electrodes out of the second electrodes 52a to 52g. The first electrode driver 14 supplies the drive signals Vp to the first electrodes 51. The second electrode 52a outputs the detection signals VdetC associated with a change in the capacitance between the first electrodes 51 and the second electrode 52a and a change in the capacitance between the second electrodes 52b to 52f and the second electrode 52a. The second electrode 52g outputs the detection signals VdetC associated with a change in the capacitance between the first electrodes 51 and the second electrode 52g and a change in the capacitance between the second electrodes 52b to 52f and the second electrode 52g. The third electrodes 53 output the detection signals VdetC associated with a change in the capacitance between the first electrodes 51 and the third electrodes 53 and a change in the capacitance between the second electrodes 52b to 52f and the third electrodes 53.

The detection device 40 can determine whether the detected object is in proximity to the first surface 100a based on the detection signals VdetC output from the second electrodes 52a and 52g and the third electrodes 53. The detection device 40 compares the detection signals VdetC output from the first portions 53a and 53b with those output from the first portions 53c and 53d, thereby detecting the position of the detected object in the second direction Dy. The detection device 40 compares the detection signals VdetC output from the second electrode 52a with those output from the second electrode 52g, thereby detecting the position of the detected object in the first direction Dx. The detection device 40 thus can determine whether the detected object is in proximity to the first surface 100a and detect a gesture, such as a change in the position, of the detected object.

In the present embodiment, the second electrodes 52a and 52g arranged on the outer sides in the first direction Dx out of the second electrodes 52a to 52g arrayed in the first direction Dx serve as the detection electrodes in hover detection. This configuration requires a smaller number of third electrodes 53 and thus requires a smaller number of wires L1 coupled to the respective third electrodes 53. Consequently, this configuration can make the frame area Gd narrower.

While two second electrodes 52a and 52g according to the present embodiment are used as the detection electrodes in hover detection, the present invention is not limited thereto. Similarly to the third embodiment, for example, the second electrode 52d arranged at the center in the first direction Dx may be used as the detection electrode besides the second electrodes 52a and 52g.

Figure 23:
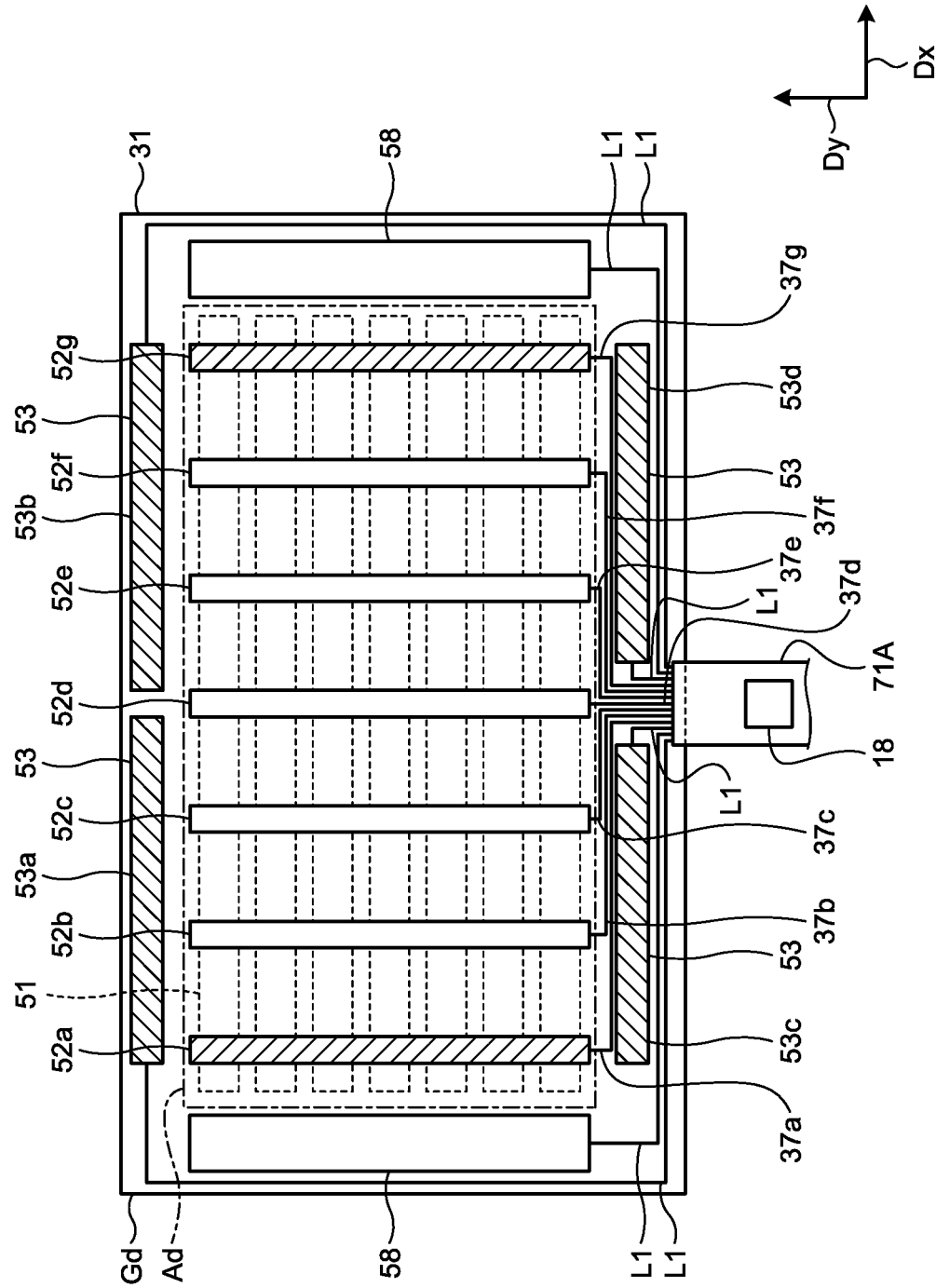
FIG. 23 is a plan view for explaining the configuration of the electrodes according to a modification of the fourth embodiment.

FIG. 23 is a plan view for explaining the configuration of the electrodes according to a modification of the fourth embodiment. The present modification includes shield electrodes 58 on the short sides of the frame area Gd like the second portions 53e and 53f illustrated in FIG. 10 and other drawings. The shield electrodes 58 are arranged adjacent to the second electrodes 52a and 52g in the first direction Dx and provided along the second direction Dy.

In the detection periods Pt1 and Pt2 illustrated in FIG. 22, the third electrode driver 16 according to the present modification supplies the guard signals VgdN to the third electrodes 53. The third electrode driver 16 can also supply the guard signals VgdN to the shield electrodes 58. This mechanism further suppresses noise generated from the gate scanner circuits 12A and various kinds of wiring included in the TFT layer 24 (refer to FIG. 8). In the detection periods Pt3 and Pt4, the third electrode driver 16 supplies the guard signals Vgd to the third electrodes 53. The third electrode driver 16 can also supply the guard signals Vgd to the shield electrodes 58. This mechanism can reduce stray capacitance in the first electrodes 51 and the second electrodes 52a to 52g, thereby increasing the detection accuracy in touch detection.

Fifth Embodiment

Figure 24:
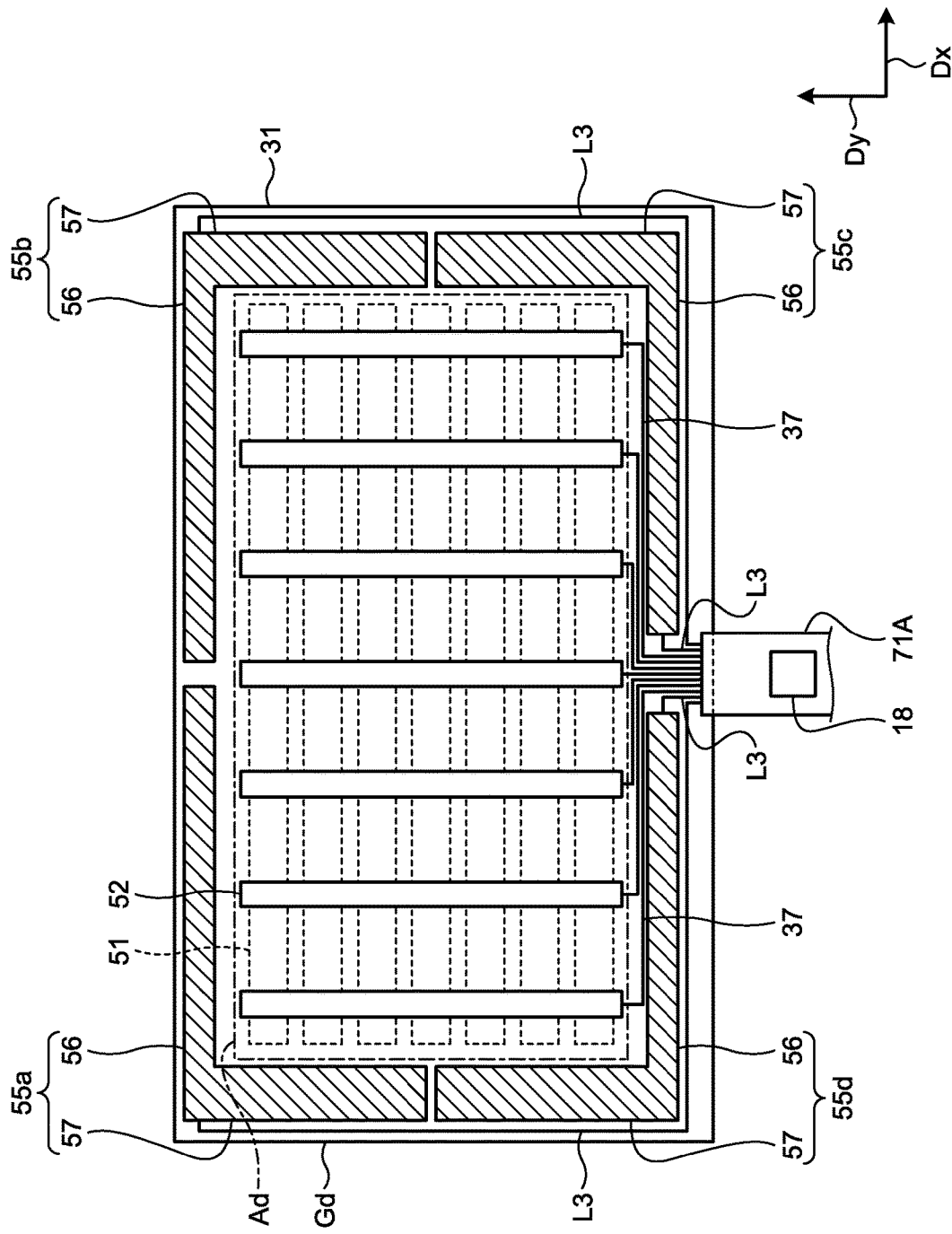
FIG. 24 is a plan view for explaining the configuration of the first electrodes, the second electrodes, and the third electrodes according to a fifth embodiment of the present invention.

FIG. 24 is a plan view for explaining the configuration of the first electrodes, the second electrodes, and the third electrodes according to a fifth embodiment of the present invention. The configuration of the first electrodes 51 and the second electrodes 52 are the same as those of the embodiments above. In other words, the first electrode 51 is provided along the first direction Dx and a plurality of the first electrodes 51 are arrayed in the second direction Dy in the display area Ad of the first substrate 21 (not illustrated in FIG. 24). The second electrode 52 is provided along the second direction Dy and a plurality of the second electrodes 52 are arrayed in the first direction Dx in the display area Ad of the second substrate 31.

Third electrodes 55a to 55d each have a first portion 56 and a second portion 57. The first portion 56 is provided along the first direction Dx. The second portion 57 is coupled to the first portion 56 and provided along the second direction Dy. The third electrodes 55a to 55d each have an L-shape, and the four third electrodes 55a to 55d are arranged in a manner surrounding the first electrodes 51 and the second electrodes 52 in planar view. The third electrodes 55a to 55d are coupled to the flexible substrate 71A provided to a long side of the frame area Gd via respective wires L3. The wires 37 coupled to the respective second electrodes 52 pass through a gap between the ends of the adjacent third electrodes 55c and 55d and are coupled to the flexible substrate 71A.

The first portions 56 are arranged side by side with the first electrodes 51 and adjacent to the ends of the second electrodes 52 in the longitudinal direction. The second portions 57 are arranged side by side with the second electrodes 52 and adjacent to the ends of the first electrodes 51 in the longitudinal direction. The connections between the first portions 56 and the second portions 57 are arranged at the respective corners of the frame area Gd. The length of the first portion 56 in the first direction Dx is longer than that of the second portion 57 in the second direction Dy. The width (length in the second direction Dy) of the first portion 56 is smaller than the width (length in the first direction Dx) of the second portion 57.

In hover detection, the drive signals Vp are supplied to at least one of the first electrodes 51 and the second electrodes 52. The third electrodes 55a to 55d output the detection signals VdetC associated with a change in the capacitance between the first electrodes 51 and the third electrodes 55a to 55d and a change in the capacitance between the second electrodes 52 and the third electrodes 55a to 55d. The detection device 40 can determine whether the detected object is in proximity to the first surface 100a and detect a gesture, such as a change in the position, of the detected object based on the detection signals VdetC output from the third electrodes 55a to 55d.

The detection device 40, for example, compares the detection signals VdetC output from the third electrode 55a arranged at the upper left corner in FIG. 24 with those output from the third electrode 55b arranged at the upper right corner, thereby calculating the position of the detected object in the first direction Dx. The detection device 40 compares the detection signals VdetC output from the third electrode 55d arranged at the lower left corner with those output from the third electrode 55c arranged at the lower right corner, thereby calculating the position of the detected object in the first direction Dx. The detection device 40 compares the detection signals VdetC output from the third electrode 55a with those output from the third electrode 55d, thereby calculating the position of the detected object in the second direction Dy. The detection device 40 compares the detection signals VdetC output from the third electrode 55b with those output from the third electrode 55c, thereby calculating the position of the detected object in the second direction Dy. The detection device 40 may compare the detection signals VdetC output from the third electrode 55a with those output from the third electrode 55c, thereby calculating the position of the detected object in a diagonal direction of the display area Ad. The detection device 40 may compare the detection signals VdetC output from the third electrode 55b with those output from the third electrode 55d, thereby calculating the position of the detected object in another diagonal direction of the display area Ad.

The four third electrodes 55a to 55d according to the present embodiment have shapes line-symmetrical with each other and substantially the same area. When the detected object is not in proximity to the first surface 100a, the capacitance values of the four third electrodes 55a to 55d are substantially equal. This configuration can facilitate calculation of the position of the detected object performed by the detection device 40, thereby accurately detecting a gesture, such as a change in the position, of the detected object. The shape or the like of the third electrodes 55a to 55d is not limited to that in the example illustrated in FIG. 24 and may be changed as appropriate. The width of the second portion 57, for example, may be equal to that of the first portion 56.

Sixth Embodiment

FIG. 25 is a timing waveform chart of an exemplary operation performed by the display apparatus according to a sixth embodiment of the present invention. In hover detection in the detection period Pt5, the first electrodes 51 and the second electrodes 52 according to the embodiments above serve as the drive electrodes, and the third electrodes 53 serve as the detection electrodes as illustrated in FIG. 13, for example. The present invention is not limited thereto. The third electrodes 53 may serve as the drive electrodes, and at least one of the first electrodes 51 and the second electrodes 52 may serve as the detection electrodes.

As illustrated in FIG. 25, the display operations in the display periods Pd1 to Pd5 and the detection operations in the detection periods Pt1 to Pt4 are the same as those according to the first embodiment. In the detection period Pt5, the third electrode driver 16 supplies the drive signals Vp to the third electrodes 53. The second electrodes 52 output the detection signals VdetC associated with a change in the capacitance between the second electrodes 52 and the third electrodes 53. At this time, the first electrode driver 14 may make the first electrodes 51 into a floating state.

The detection device 40 can determine whether the detected object, such as a finger and a hand, is in proximity to the first surface 100a and detect a gesture, such as a change in the position, of the detected object based on the detection signals VdetC output from the third electrodes 53. The detection device 40, for example, compares the detection signals VdetC output from the respective second electrodes 52, thereby calculating the position of the detected object in the first direction Dx.

In the example illustrated in FIG. 25, the second electrodes 52 serve as the detection electrodes in hover detection. The present invention is not limited thereto, and the first electrodes 51 may serve as the detection electrodes in hover detection. In other words, the third electrode driver 16 supplies the drive signals Vp to the third electrodes 53, and the first electrodes 51 output the detection signals VdetC associated with a change in the capacitance between the first electrodes 51 and the third electrodes 53. In this case, the second electrode driver 15 may make the second electrodes 52 into a floating state. The detection device 40, for example, compares the detection signals VdetC output from the respective first electrodes 51, thereby calculating the position of the detected object in the second direction Dy.

While exemplary embodiments according to the present invention have been described, the embodiments are not intended to limit the invention. The contents disclosed in the embodiments are given by way of example only, and various changes may be made without departing from the spirit of the invention. Appropriate changes made without departing from the spirit of the invention naturally fall within the scope of the invention. At least one of various omissions, substitutions, and changes of the components may be made without departing from the spirit of the embodiments above and the modification thereof.

The third electrodes 53 according to the third to the fifth embodiments, for example, are provided to the same layer as that of the second electrodes 52 on the second substrate 31. The present invention is not limited thereto, and the third electrodes 53 may be provided to the frame area Gd of the cover member 100 as described in the second embodiment.

What is claimed is:

1. A display apparatus comprising:
    a first substrate;
    a second substrate facing the first substrate;
    a display functional layer provided between the first substrate and the second substrate and configured to display an image in a display area;
    first electrodes provided in the display area between the first substrate and the second substrate;
    second electrodes provided in the display area on a surface of the second substrate, the second electrodes facing the first electrodes, wherein the second electrodes are divided into a first group of second electrodes that includes at least one of the second electrodes and a second group of second electrodes that includes the remaining second electrodes;
    third electrodes provided in a frame area on an outer side of the display area; and
    a drive circuit configured to supply a first drive signal to the first electrodes and the second group of second electrodes in a first detection period,
    wherein, in the first detection period, the third electrodes output a first detection signal based on a change in capacitance between the third electrodes and at least one of:
    the first electrodes that overlap the second electrodes; or
    the second group of second electrodes; and
    wherein, in the first detection period, the first group of second electrodes outputs a second detection signal based on a change in capacitance between the first electrodes and the first group of second electrodes.

2. The display apparatus according to claim 1, wherein the drive circuit is configured to output a second drive signal different from the first drive signal to the first electrodes in a second detection period different from the first detection period, and
    the second electrodes output the second detection signal based on a change in capacitance between the second electrodes and the first electrodes in the second detection period.

3. The display apparatus according to claim 2, wherein the third electrodes are supplied with a guard signal for suppressing stray capacitance in the second electrodes in the second detection period.

4. The display apparatus according to claim 3, wherein the guard signal is a DC voltage signal having a same electric potential as an electric potential of the second electrodes.

5. The display apparatus according to claim 1, wherein the first group of second electrodes is positioned at a center in a direction in which the second electrodes are arrayed.

6. The display apparatus according to claim 1, wherein the first group of second electrodes is positioned on an outer side in a direction in which the second electrodes are arrayed.

7. The display apparatus according to claim 1, wherein the second group of second electrodes are arrayed in a first direction along a side of the frame area and provided along a second direction intersecting with the first direction.

8. The display apparatus according to claim 7, wherein the third electrodes include a first portion provided along the first direction and arranged adjacent to ends of the second group of second electrodes.

9. The display apparatus according to claim 7, wherein the third electrodes include a second portion provided along the second direction and arranged side by side with the second group of second electrodes in the first direction.

10. The display apparatus according to claim 7, wherein the third electrodes include a first portion provided along the first direction and a second portion coupled to an end of the first portion and provided along the second direction.

11. The display apparatus according to claim 1, further comprising: pixel electrodes facing the first electrodes, wherein the drive circuit is configured to supply a display drive signal serving as a common potential to the first electrodes in a display operation.

12. A detection device comprising:
    a first substrate;
    first electrodes provided in a first area on the first substrate, second electrodes provided on a surface of a second substrate facing the first substrate in the first area, the second electrodes facing the first electrodes, wherein the second electrodes are divided into a first group of second electrodes that includes at least one of the second electrodes and a second group of second electrodes that includes the remaining second electrodes;

third electrodes provided in a second area outside the first area; and a drive circuit configured to supply a first drive signal to the first electrodes and the second group of second electrodes in a first detection period, wherein, in the first detection period, the third electrodes output a first detection signal based on a change in capacitance between the third electrodes and at least one of: the first electrodes that overlap the second electrodes; or the second group of second electrodes; and wherein, in the first detection period, the first group of second electrodes outputs a second detection signal based on a change in capacitance between the first electrodes and the first group of second electrodes.

\* \* \* \* \*